US011056982B2

(12) United States Patent
Weyh et al.

(10) Patent No.: US 11,056,982 B2
(45) Date of Patent: Jul. 6, 2021

(54) POWER CONVERTER FOR ENERGY TRANSMISSION

(71) Applicant: Universitat der Bundeswehr Munchen, Neubiberg (DE)

(72) Inventors: Thomas Weyh, Neubiberg (DE); Richard Eckerle, Neubiberg (DE); Florian Helling, Neubiberg (DE); Reinhard Knauer, Munich (DE)

(73) Assignee: Universität der Bundeswehr München, Neubiberg (DE)

( * ) Notice: Subject to any disclaimer, the term of this patent is extended or adjusted under 35 U.S.C. 154(b) by 82 days.

(21) Appl. No.: 16/498,289

(22) PCT Filed: Apr. 13, 2018

(86) PCT No.: PCT/EP2018/059572
§ 371 (c)(1),
(2) Date: Sep. 26, 2019

(87) PCT Pub. No.: WO2018/189389
PCT Pub. Date: Oct. 18, 2018

(65) Prior Publication Data
US 2021/0111642 A1 Apr. 15, 2021

(30) Foreign Application Priority Data
Apr. 13, 2017 (DE) .................. 10 2017 108 099

(51) Int. Cl.
*G01N 27/416* (2006.01)
*H02M 7/483* (2007.01)
(Continued)

(52) U.S. Cl.
CPC ............ *H02M 7/483* (2013.01); *B60L 50/51* (2019.02); *H02M 7/537* (2013.01); *B60L 2210/40* (2013.01)

(58) Field of Classification Search
None
See application file for complete search history.

(56) References Cited

U.S. PATENT DOCUMENTS 6,005,788 A 12/1999 Lipo et al.
10,439,506 B2 * 10/2019 Gotz ..................... H02M 7/003
(Continued)

FOREIGN PATENT DOCUMENTS

WO 02/063758 A1 8/2002
WO 2007028350 A1 3/2007
(Continued)

OTHER PUBLICATIONS

Rodriguez, J. et al., "Multilevel Voltage-Source-Converter Topologies for Industrial Medium-Voltage Drives." IEEE Transactions on Industrial Electronics, vol. 54, No. 6, Dec. 1, 2007, 16 pages.
(Continued)

*Primary Examiner* — Jared Fureman
*Assistant Examiner* — Esayas G Yeshaw
(74) *Attorney, Agent, or Firm* — Fletcher Yoder, P.C.

(57) ABSTRACT

The invention relates to a modular power converter which is configured from at least one main module to be actively supplied and an arbitrary number of N–1 further modules. All modules are connected to one another in series (for example by modular terminals, where the term modular terminals shall also comprise any other kind of electrical connection, and in particular plug connections). Each module comprises switching devices and at least one energy storage device, as a result of which the individual module is capable of being charged with an adjustable voltage. The switching devices, which are preferably realized by transistors, allow the module to be connected according to an active operation in terms of the series connection or according to a bypass operation in which case the respective (Continued)

module is quasi bridged and therefore cannot contribute to the voltage path of the series connection. The output voltage of the power converter is tapped at the end points of the series connection.

51 Claims, 18 Drawing Sheets

(51) Int. Cl.
*B60L 50/51* (2019.01)
*H02M 7/537* (2006.01)

(56) References Cited

U.S. PATENT DOCUMENTS

| | | | |
|---|---|---|---|
| 10,594,146 B2* | 3/2020 | Shibata | H02J 7/0036 |
| 10,840,714 B2* | 11/2020 | Gotz | H02M 7/003 |
| 10,897,145 B2* | 1/2021 | De Breucker | H02J 7/0024 |
| 2008/0144342 A1 | 6/2008 | Du et al. | |
| 2009/0261793 A1* | 10/2009 | Urakabe | H02J 7/0016 |
| | | | 323/282 |
| 2010/0001737 A1* | 1/2010 | Kubo | H02J 7/0013 |
| | | | 324/434 |
| 2014/0376287 A1* | 12/2014 | Narimani | H02M 3/07 |
| | | | 363/60 |
| 2016/0167528 A1* | 6/2016 | Yang | H02M 5/458 |
| | | | 307/9.1 |
| 2018/0037121 A1* | 2/2018 | Narla | B60L 53/00 |
| 2018/0198289 A1* | 7/2018 | Sugeno | H02J 7/0029 |
| 2020/0127581 A1* | 4/2020 | Chen | H02M 3/3376 |

FOREIGN PATENT DOCUMENTS

| | | |
|---|---|---|
| WO | 2012072197 A2 | 6/2012 |
| WO | 2013075928 A1 | 5/2013 |

OTHER PUBLICATIONS

Communication Pursuant to Article 94(3) EPC for Application No. 18718422.1 dated Nov. 27, 2020, 6 pages.
International Search Report for PCT/EP2018/059572 dated Jul. 4, 2018, 4 pages.
Office Action for DE Application No. 102017108099.6 dated Oct. 19, 2017, 10 pages.

* cited by examiner

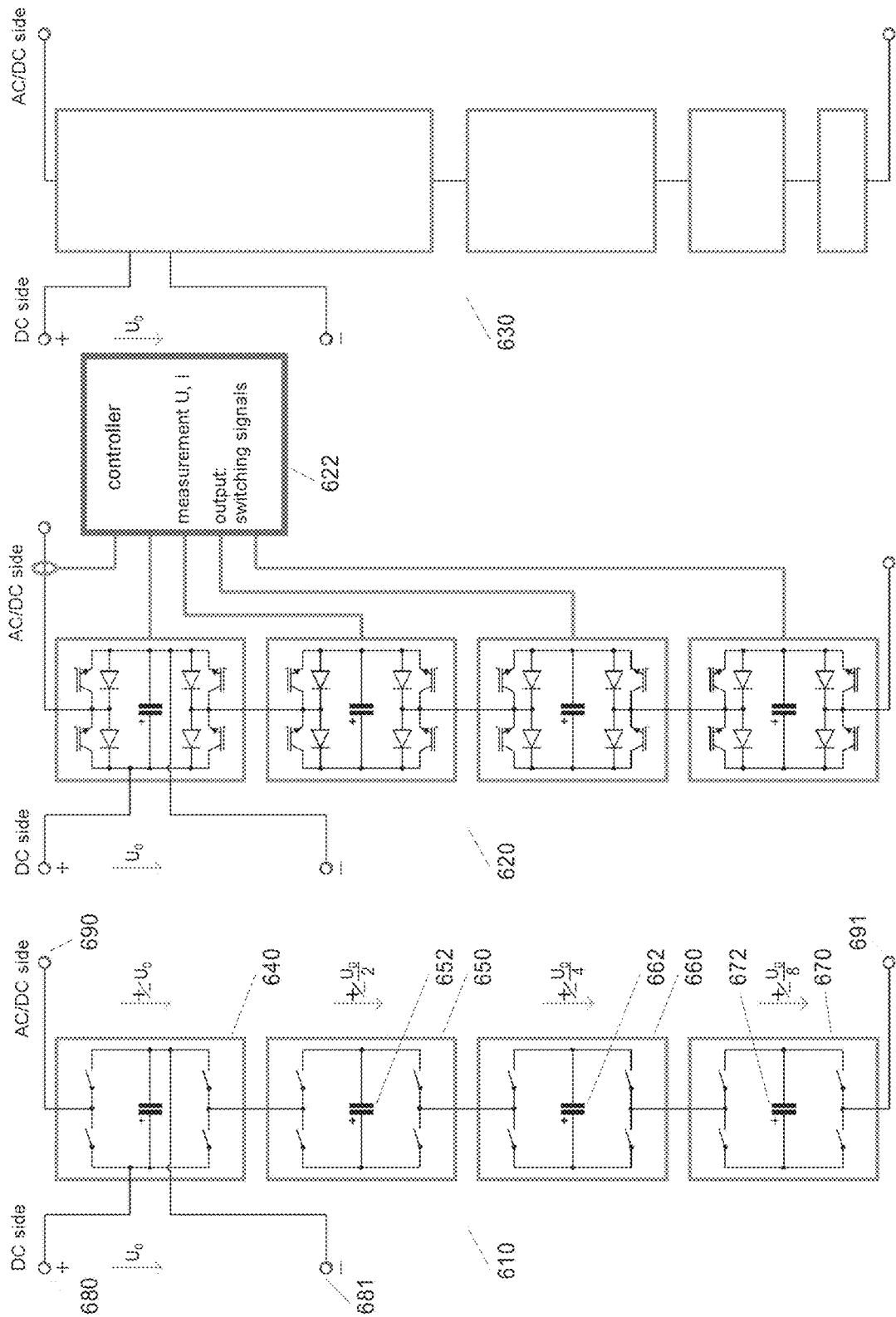

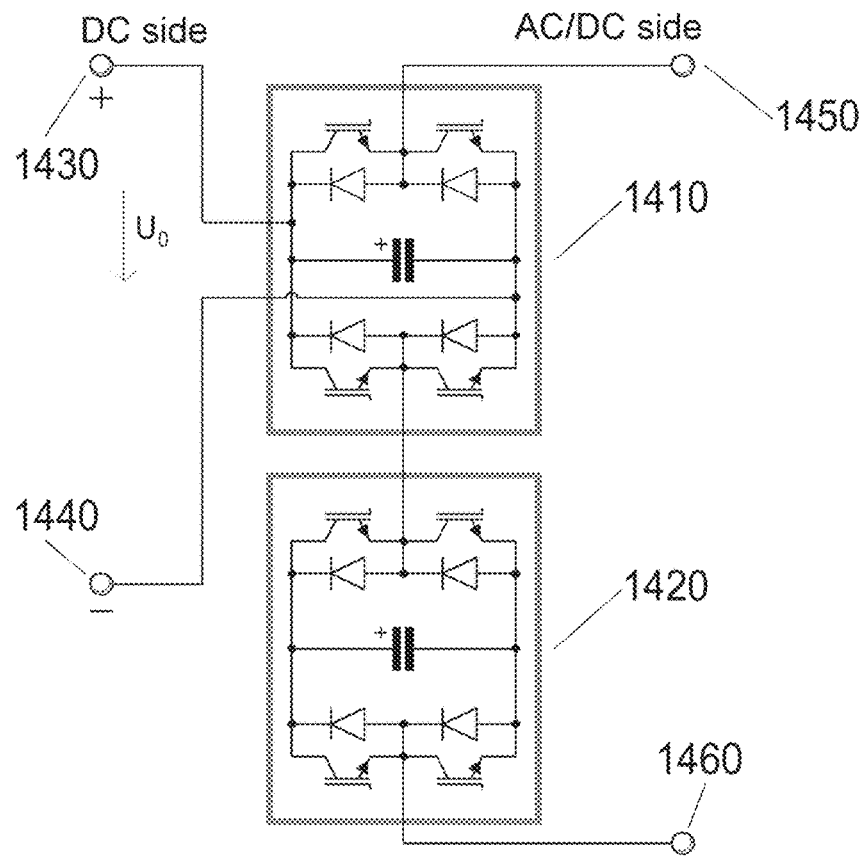
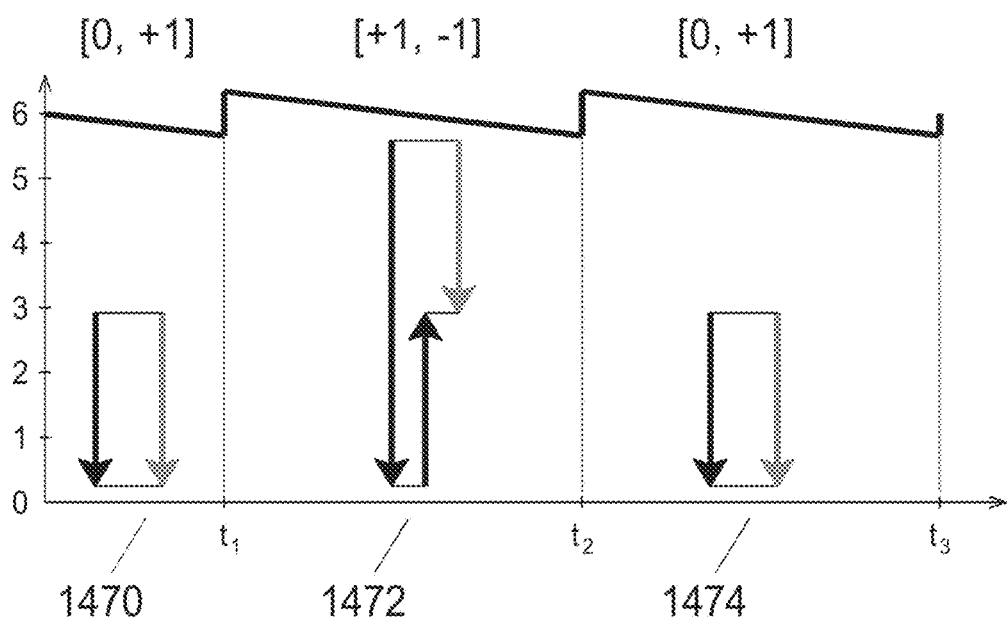
FIG. 14

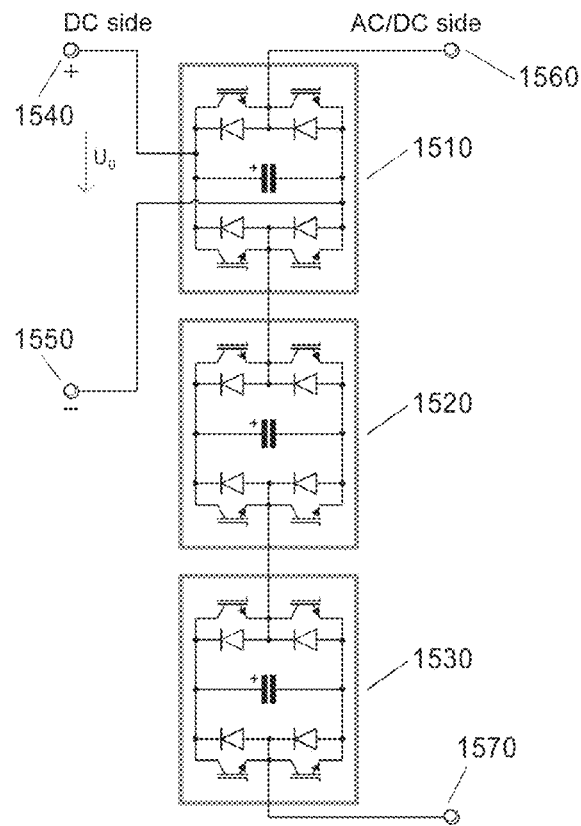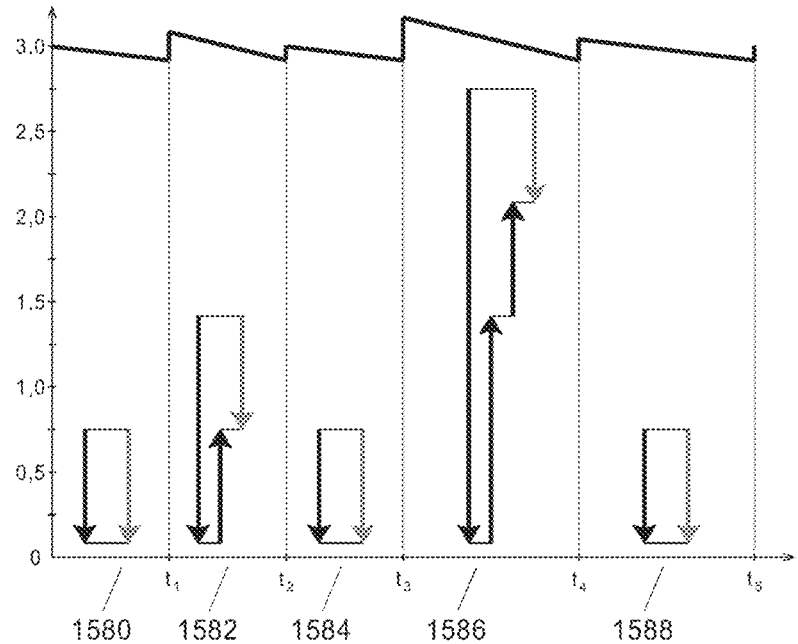
FIG. 15

FIG. 17

POWER CONVERTER FOR ENERGY TRANSMISSION

CROSS-REFERENCE TO RELATED APPLICATIONS

This application is a national stage of PCT application no. PCT/EP2018/059572, entitled "CONVERTER FOR ENERGY TRANSMISSION", filed on Apr. 13, 2018, which claims priority to German application no. DE102017108099.6 filed on Apr. 13, 2017, both of which are hereby incorporated by reference in their entirety.

The present invention relates generally to the field of power electronic devices, and particularly to devices used in industry and cooled by liquids.

The invention relates to an improved power converter as well as a corresponding method and relates, in particular, to power converters for bidirectional energy transmission and with the option of changing the output voltage stepwise.

Power converters are used to convert one type of electric current supplied (DC, AC) to the respective other type, or to change characteristic parameters such as the voltage or frequency. Both principles are often applied in combination.

Power converters are used in a wide variety of fields. They are used, in particular, for actuating electric machines, in particular also for actuating electric motors in vehicles. A further field of application is the supply of energy/power supply in electricity grids, on-board systems or, more generally, in power grids. Accordingly, there are different types of power converters. Firstly, DC-to-DC converters which as direct voltage converters convert a first direct voltage to a second direct voltage, which can be higher, lower or inverted. Secondly, there are so-called AC-DC converters, which convert alternating current into direct current (rectifiers) or direct current to alternating current (AC converters). By connecting together two AC-DC converters via the direct current side, AC-AC converters can thus also be set up.

Modern power converters use electronic components based on semiconductors, such as transistors, diodes and thyristors. One important basic circuit are two-quadrant actuators and four-quadrant actuators. The latter allow for negative as well as positive voltages to be processed on a pair of terminals, regardless of the current direction. Applications for this include the controlled supply of electrical energy to an electric motor and the reconversion of mechanical energy into electrical energy during the braking phase (recuperation).

The continuous development of semiconductor technology introduced about 35 years ago into power electronics enables and supports the realization of such power converters for ever higher power and voltage ranges. Today, for example, IGBTs and IGCTs are mainly used in the medium voltage range for switching electrical currents and voltages. Due to the continuous development of semiconductors and their manufacturing processes, the reliability and power density of these components has increased significantly.

The development of semiconductors also promotes the development of novel power converter topologies. HVDC systems (high voltage direct current transmission) in the high-voltage range (up to several GVA) are still largely implemented using thyristor circuits. They operate according to the principle of phase-fired control and can generate or process different voltage levels depending on the firing angle. However, complex filter circuits are required to filter out the high harmonic wave content. Recently, multi-level point power converters with significantly improved properties for energy transmission, voltage and frequency conversion and reactive power compensation have become the focus of interest.

Especially in the fields of application in the energy supply sector for high performance, the voltages to be switched with the power converter are considerably higher than the cutoff voltages of available power semiconductors. Circuit topologies which allow an even distribution of the high input voltage to several switching members/power semiconductors, for example by serial circuitry, are therefore used in such fields of application.

Many drawbacks of conventional power converters for large outputs can be solved by so-called modular multilevel converters, see, for example, DE 102 17 889 A1. This system is able to convert almost any voltage curve between the pairs of terminals of one side into equally arbitrary curves between the pairs of terminal of the other side, whereby no distinction needs to be made between input and output due to bi-directionality. The power converter's electronics, which are assigned to each phase, are made up of a large number of identical individual modules connected in series.

FIG. 1 shows a schematic view of a three-phase two-level power converter 110 for an electric motor 120, as it is used, for example, in electric vehicles. The two-level power converter is formed by three parallel phase modules or half bridges 130, 132, 134. Each phase module consists of two switches 140, 142 connected in series. Disposed at the connection points of these switches is a terminal for each phase 150, 152, 154. The pair of input terminals of the two-level power converter is fed by a schematically indicated direct current energy source 160.

FIG. 2 shows corresponding series connections of identical modules, where the three upper modules 201, 102, 203, together form a so-called bridge branch 211. A combination of two bridge branches 211, 212 (consisting of any number of modules) is there referred to as a phase module 213. This phase module is typically connected to the terminals of a direct current system or an intermediate direct current circuit, respectively. The number of modules in each bridge branch defines the voltage and harmonic wave properties of the power converter. The connection points of the two bridge branches of each phase module form an alternating current terminal of a power converter.

Each individual module can be considered as electrically being a two-terminal circuit and contains an energy storage element as well as several switching elements that can optionally take up or deliver current for one or both voltage directions. The modules can switch either only one polarity of the voltage for two possible current directions and are then referred to as two-quadrant modules; or they can reach all four quadrants of the current-voltage graph and are then referred to as four-quadrant modules.

FIGS. 3a-3c show a basic form of a two-terminal module. The three four-quadrant modules shown can be used in a similar manner also for the present invention. A four-quadrant module 330 according to FIG. 3a requires at least 4 switching transistors 301-304. Such a circuit is also referred to as a full or H bridge. Two of the transistors 301 and 302 and 303 and 304 connected in series each form a so-called half bridge. A diode 305-308 is switched parallel to these transistors and can also be the integrated body diode of the respective transistor. In principle, any kind of actuateable switch can be used for the switching elements. Accordingly, full bridge 340 can be generally realized by four switching devices 341-344, as shown in FIG. 3b. The transistors or switches can electrically connect output terminals 310 and 311 to capacitor 309.

As explained on the basis of FIG. 3a, four states can be switched:

predetermining a positive terminal voltage with respect to two terminals 310 and 311 for any current direction; obtainable by simultaneously switching transistor switches 301 and 304;

predetermining a negative terminal voltage with respect to two terminals 310 and 311 for any current direction; obtainable by simultaneously switching transistor switches 302 and 303;

bypass state (i.e. no energy take-up or delivery by the individual module), free current flow in any direction; obtainable by simultaneously switching transistor switches 301 and 303 or transistor switches 302 and 304;

forcing energy take-up by the individual module by imposing the voltage level; for example, if all transistor switches are cut off and the magnitude of the terminal voltage applied from the outside exceeds the voltage of capacitor 309.

Alternatively, the modules can be configured as two-quadrant modules 350, as shown in FIG. 3c. In this case, only a half bridge consisting of two switches 323 and 324 disposed in series is used. The two output terminals 320 and 321 can then be switched in such a way that either a positive voltage is applied at the output terminals or they are switched to the bypass state. A chain of modules can then map almost any voltage curve, for example, a sine curve, according to the individually selected switching states of the modules and their change over time according to a step function.

Depending on the application, the modules of the modular multilevel converter can be connected for n sources and m outputs (e.g. m=3 for a three-phase low voltage system).

The phase modules form the basic building blocks of a one or multi-phase power converter. For example, with three phase modules 401, 402 and 403 connected together according to FIG. 4, a system can be used to convert direct voltage to three-phase alternating voltage, where the connecting points of two bridge branches each form a terminal 410, 411 and 412 for the three phases of the three-phase system.

FIG. 5 shows the interconnection of 5 phase modules 501 to 505 as an example of coupling a three-phase power grid to a two-phase grid. Such a system can be used, for example, to convert a power grid with 50 Hz alternating voltage to a power grid with 60 Hz alternating voltage. For this purpose, one would connect the three phases of the 50 Hz system by way of the three terminals to the left hand part of the circuit shown in FIG. 5, which forms a direct voltage from this, which is then fed via the common terminals to the right-hand part of the circuit, which generates a two-phase alternating voltage of 50 Hz from this. In the phase module according to FIG. 2, consisting of 2 bridge branches of 3 modules each, the operating voltage for each individual module can be, for example, 1 kV. In the case of two-quadrant modules, each module can then switch a voltage of 0V or 1 kV at its terminals. A voltage of 3 kV should therefore be present in the direct current circuit. This allows for all module configurations of all 6 modules involved, the total series connection of which results in a total voltage of 3 kV. Compared to fictitious central tapping of the direct current circuit, the output of the phase module of FIG. 2 would therefore be able to assume the states −1.5 kV, −0.5 kV, +0.5 kV, 1.5 kV. If four-quadrant modules were used, each module would be able to switch a voltage of −1 kV, 0 kV, or 1 kV at its terminals, as shown in above example. Such a phase module can therefore also output voltages that are greater than the positive voltage of the direct current circuit or its negative voltage can extend below the negative voltage of the direct current circuit. Accordingly, a lower voltage can be used in the direct current circuit. Generally speaking, various stable voltage states can be generated over each phase module $2z+1$ for z number of modules per bridge branch.

The modular multilevel converters described are usually used for high outputs, for example, in power grids, similar to the example described with respect to FIG. 5.

In contrast, smaller electrical outputs (up to some 100 kVA) are converted with pulse-width modulated power converters (PWM power converters), in which the mean voltages and currents are controlled by a suitable duty cycle (instead of the step function of the multilevel converters) of the magnitudes switched. The voltage is switched either between "+" and "−" or, "+" and "0" or "−" and "0" of the direct voltage circuit. This is referred to as two-level or three-level power converters, as they switch back and forth between two or three voltage levels. A sine curve is formed, for example, in that the duty cycle steadily increase from 0 to exhibit the maximum duty cycle in the range of the maximum of the sine curve. From there, the duty cycle decreases again and at the zero crossover reaches the value 0 and at the maximum negative value of the sine the maximum duty cycle with negative voltage (three-point power converter), or reaches the value 0 at the maximum negative value of the sine (two-level converter). However, this type of power converter—similar to thyristor-based power converters—generates a very high level of harmonic waves due to the high-frequency switching processes and always consistently high amplitude of the pulses, which makes elaborate filtering of the inputs and outputs necessary. For example, a switching frequency of 50 kHz is typically required to replicate a sine profile of 50 Hz. At very high voltages (and therefore also high performances), firstly, the necessary electric strength is not available with regard to the components; secondly, switching losses and filter requirements also rise sharply.

Conventional modular multilevel converters (MMC) offer great advantages in this respect, but have the following drawbacks for small and medium performance (e.g. 100 VA to 1 MVA):

In order to generate a sufficiently finely stepped voltage curve, a large number of modules is required for MMCs (for example, 100 modules for every phase are required for a total of 50 voltage steps).

This large number of modules is independent of the power switched and high costs are therefore incurred even where only low outputs are switched. The costs are therefore too high for many applications.

Since each module of the MMC is to be actuated and supplied individually, the electronic complexity required for this is disproportionate, especially for small outputs, which makes such systems very expensive.

at small frequencies of the associated alternating current system, high capacities are required for the module capacitors in order to be able to maintain the voltage levels for a correspondingly long time. While this does not represent a particular disadvantage in the case of grid power converters, this property is particularly detrimental in the field of motor power converters, for example those used in electric vehicles. The sizing would have to take into account the low frequency of the regularly recurring motor start-up.

Overview of the Invention

It is the object of the invention to provide a power converter, as well as a corresponding method, which does not have the above drawbacks.

According to a first aspect, the invention relates to a modular power converter which is configured having at least one main module which is to be actively supplied and an arbitrary number of N−1 further modules. All modules are connected to one another in series (for example by modular terminals, where the term "modular terminals shall also include any other kind of electrical connection, and in particular plug connections). Each module comprises switching devices and at least one energy storage device, so that the individual module is able to be charged with an adjustable voltage. The switching devices, which are preferably realized by transistors, allow the module to be connected to active operation with regard to series connection or to bypass operation, in which case the respective module is quasi bridged, and therefore cannot contribute to the voltage path of the series connection. The output voltage of the power converter is tapped at the end points of the series connection. The tapping therefore occurs preferably at the respective output terminals, where the term output terminals comprises any type of electrical connection option. The main module is supplied by a direct voltage source, so that the main module is held at a substantially constant voltage level by this direct voltage source, where said voltage level can be delivered to the voltage path in active operation by the main module. The main module preferably comprises a storage device, such as a capacitor, however, this is not mandatory due to the supply from a direct voltage source. As a result, each module can contribute with the voltage prevailing at its storage device to the total voltage of the voltage path (active operation) or not (bypass operation). The respective operation can be set by way of the respective switching devices.

These voltage contributions to be delivered by the individual modules differ from each other. Preferably, the voltage contributions are stepped down relative to each other by the powers of two, however, other steps, such as to the power of three or non-exponential ratios are also possible. Since only the main module (or the main modules), which does not necessarily have to be the first module in the series, is supplied with direct voltage, the other modules are charged via the serial connection to the main module. Since a plurality of different voltage steps, such as U0/0, U0/2, U0/4, U0/8, U0/16, etc., are thereby available, any possibly achievable output voltage can be realized with these partial voltages (within the total achievable voltage steps) at any time according to a desired output voltage curve. The modules, which with their partial voltages or voltage contributions are required for the composition of the desired output voltage, are for this purpose switched into active operation, the modules not required are switched to bypass operation, so that overall the desired output voltage is obtained. Therefore, a large number of resulting voltage levels can be represented, in the example according to the binary principle, with a relatively small number of modules, for example, starting out from a step to the power to two.

According to a preferred aspect of the present invention, the switching devices of the modules are configured such that the module can be connected not only serially into the voltage path but also anti-serially, so that an inverted operating state is additionally enabled. A specific module with its terminal voltage can therefore act inverted to the voltage path, for example with −U0/4. This inverted operation allows for an increase in the combination options of the individual voltage contributions and enables realizing, in particular, a certain desired output voltage by at least two or more respective different module configurations or module operating mode connections. The inverted operating mode of a module has the advantage that the respective storage device, preferably a capacitor, can be then be recharged during operation. If a module with its voltage component contributes to the voltage path, then the respective storage device is discharged due to the load current. During inverted operation, however, the load current leads to the respective module being charged, so that the resulting voltage range of this module can thus be kept within predetermined limits. If the state of charge at a storage device of a module threatens to drop below a limit value W1, then this module is switched to inverted operation in a subsequent phase, which causes the storage device to recharge (where it may indeed still be switched to the bypass mode prior to this subsequent phase). This charging is then carried out up to the limit value W2, where the module must at this time then either be switched back to a discharge operation, i.e. active operation, or to bypass operation in order to prevent overcharging. In this way, each storage device of each module can be kept within a predetermined voltage range. This can be done electrically independently of the actual storage capacity of the module. The use of smaller capacities will therefore require more frequent switching operations than when using larger capacities, as recharging must be carried out at an earlier point in time. The capacities of the individual modules can be configured to be equal, although the modules are intended to provide different voltage contributions. However, they can also be matched to the voltage level assigned to them. However, all this must be taken into account when controlling operating mode switching. The voltage range at which a particular module is held, for example, voltage U0/4+/−A is substantially obtained by selectively switching the module by way of the switching devices to either active or bypass operation or, if available, inverted operation. If there is more than one module configuration present in order to be able to realize a specific output voltage, then this redundancy allows that modules which are to be recharged are put into inverted operation in one of the next cycles as required, and a substantially constant output voltage can nevertheless be realized overall.

According to a further aspect of the invention, controlling the switching devices of the modules is assumed by a controller device which preferably switches all modules simultaneously and which is responsible for the detection of the instantaneous states of charge of the modules and the selection of the appropriate operating setting for each module. Due to the interaction of the controller device with the power converter, it is therefore possible to map a desired output voltage curve over time. Due to the possibility in this aspect of the invention to maintain a certain output voltage level at a constant level despite switching from one module configuration to another module configuration (which allows modules arriving at a charging lower limit to be recharged in the subsequent inverted operation without the overall output voltage needing to change), enables not only mapping changing output voltage curves, for example, periodic curves, but also realizing direct voltage in the output circuit. This behavior is particularly interesting for applications where very slow level changes from one output level to the next output level are to take place over time and the output voltage is therefore to remain at one voltage level (e.g. binary level) over a certain period of time.

Preferably, so-called four-quadrant modules are used as modules, where also other circuit types, for example two-quadrant modules, are possible, in particular as the main module.

According to one further aspect, the power converter according to the invention also enables energy reversal in which energy from the output side is introduced into the direct voltage source, which feeds the main module. In this mode of operation, the load current flows temporarily in the opposite direction, which causes the sign in relation to the charged behavior of the storage devices of the modules to reverse. For example, a module that is in the inverted mode is then no longer charged, but discharged. These relationships must be taken into account by the controller device which switches the operating states of the modules.

The controller device can be configured in a central or decentralized manner. It is in particular possible that a central controller device is present, but that each module additionally has a local controller device which causes the switching device in the module to switch and detects the instantaneous state of charge of the storage device and reports it to the central controller device.

According to one further aspect, the power converter according to the invention is provided without a controller device and therefore substantially comprises the module chain or module chains mentioned. For later operation, it can be coupled to an external controller device.

According to one further aspect, the power converter according to the invention is configured for multi-phase systems and then comprises multiple module chains. For example, the power converter can have three module chains if it is intended for controlling a three-phase electric motor. For such multi-phase systems, it can be advantageous to provide adapted switching devices in the modules, in particular multi-phase modules.

According to one preferred embodiment, the main module is fed with a direct voltage U0 and in the case of single-phase systems, this leads to output voltages in the range between +U0 and −U0. It is clear to the person skilled in the art, however, that output voltages can also be realized, at least for a short period of time, which are in the range of almost +2U0 and −2U0. In particular, these maximum voltages are obtained in that all modules are switched to active operation ((U0+½ U0+¼ U0+⅛ U0 etc.) or all to inverted operation (−U1−½ U0−¼ U0−⅛ U0 etc.).

According to a further aspect, the present invention relates to a method for operating a power converter according to which N module are connected in series, a direct voltage U0 is applied to the input terminals of the main module, a desired temporal course of the output voltage in relation to the amplitude is predetermined over time, an output voltage is tapped at the two end points of the series connection of the modules, and predetermined states of charge for the individual modules are maintained in that each module in its active operating state substantially delivers a predetermined voltage contribution to the series connection, where the voltage contributions of the modules differ from each other and are stepped relative to each other by the powers of two, and in that the switching devices of the modules are actuated to switch each module to an operating state in such a way that the sum of the individual module voltages, as they are provided by the energy storage device of each module according to its active, inverted or bypass operation, at all times corresponds to the predetermined range of the output voltage to be delivered.

According to a further aspect of the invention, the power converters according to the invention are used for AC/AC operation by coupling two such power converters via the direct current circuit. In this way, for example, a power converter can be set up which connects two AC systems together that have different voltages and/or different frequencies and/or different number of phases and thus enables a bidirectional exchange of energy between these systems. According to one further preferred aspect, a power converter according to the invention is used to supply an electric motor of an electric vehicle. According to one further preferred aspect, the power converter according to the invention is used to connect typical mains three-phase voltages to a direct current grid, in order to connect, for example, house connections to a local direct current grid.

BRIEF DESCRIPTION OF THE DRAWINGS

The above-mentioned and other objects, features, and advantages of the present invention will become more apparent from the following detailed description in combination with the accompanying drawings, in which:

FIGS. 6b-d show the principal structure of a single-phase power converter circuit according to one aspect of the invention, consisting of exemplary four modules;

FIG. 14 shows an illustration of the operating principle by way of a circuit with two modules for generating and the temporal course of a direct voltage set;

FIG. 15 shows an illustration of the operating principle by way of a circuit with three modules for generating and the temporal course of a direct voltage set;

In the drawings, like reference numerals depict like parts, components and assemblies.

DETAILED DESCRIPTION OF PREFERRED EMBODIMENTS

Figure 1:
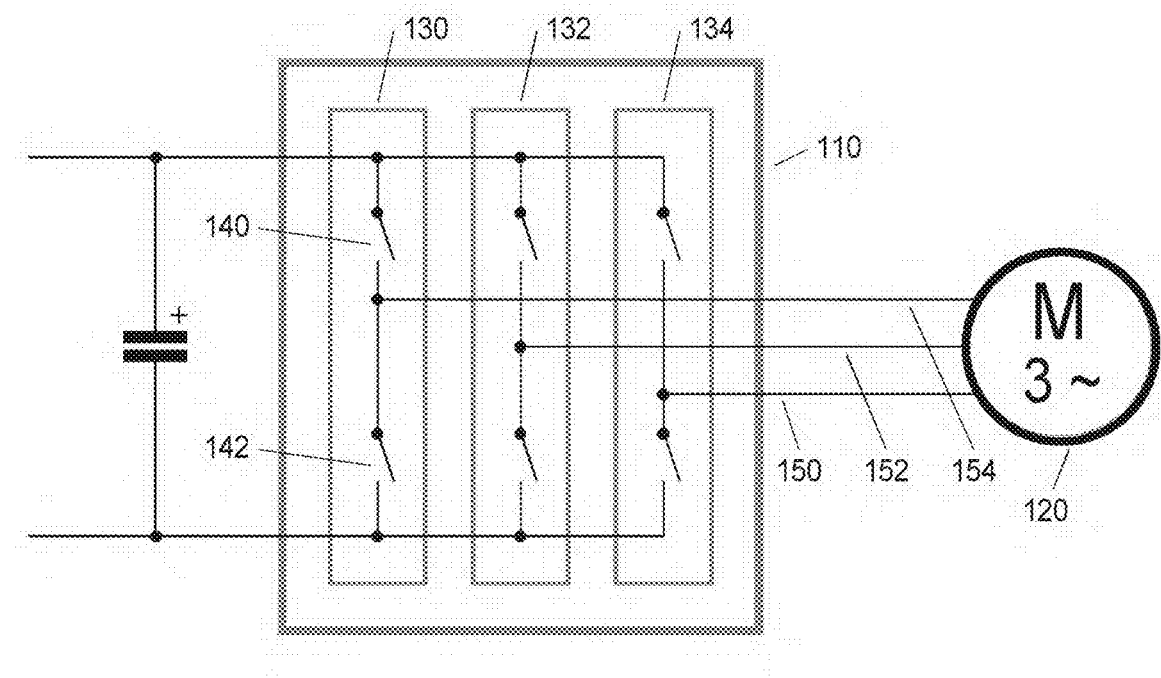
FIG. 1 describes the principle of a three-phase two-level power converter.

Basic Aspects:

According to one aspect, the invention is based on the knowledge to realize power converters for each phase by a series connection of modular two-terminal circuits, where the two-terminal circuits are in terms of their terminal voltage preferably staggered according to powers of two, such that for n modules 2(n−1) voltage levels can be realized at the ends of the series connection. The module with the highest voltage level is preferably connected to the DC circuit.

The individual modules are preferably configured as four-quadrant modules, where the use of two-quadrant modules is also possible. The terminal voltage of each module is preferably set by directly or indirectly measuring it and charging or discharging accordingly, which in turn is effected by appropriate switching of the respective transistors (or other suitable switching devices).

Although a preferred embodiment is based on a strict arrangement of the modules in series according to their maximum terminal voltage, in order to thereby make the component complexity efficient, especially for the module capacitor, (the module with the highest terminal voltage uses the capacitor with the highest voltage strength), the sequence can be chosen randomly according to one aspect of the invention (as long as the voltage strengths of the individual capacitors are not exceeded) and this sequence can be modified during operation by a controller or control device configured for this purpose. For example, in the event of a module's failure, its priority can be to the smallest possible binary value set by the controller, which would make the failure of that module only noticeable as a slight deterioration of the stepping.

Therefore, the configuration of a single module preferably does not necessarily define the maximum terminal voltage that can be adjusted thereat; it is instead set by a higher-level control device or controller device, which can detect the instantaneous potential by respective charging and discharging. The instantaneous terminal voltage at a module can be detected directly thereat (direct measurement), or quasi at a higher level (indirect measurement) by measuring only the entire terminal voltage of the series connection taking into account at least the instantaneous switching states and preferably previous switching states. The voltage changes of the module capacitors can preferably be taken into account by way of the current that flows through the series connection and their capacity.

The invention according to a further aspect is based on the realization that a power converter, which is to be set up from a series connection of several individual modules acting as two-terminal circuits, must be configured in such a way that the voltages of these individual modules are to have different values, preferably staggered according to the powers of two. The individual modules are to contain energy storage elements and further to be of such nature that they output the voltage of the energy storage element at their respective two terminals, output their inverted voltage or are switched to a bypass mode (voltage drop 0) in which a conductive connection is established between the terminals without charging or discharging the energy storage element. By way of respectively activating, disabling/bypass mode and reversing/inverting the energy storage elements, the serial connection of the individual modules in this manner causes a very finely stepped adjustment of the output voltage and thereby the desired voltage curve and at the same time makes it possible to either charge or discharge the energy storage elements of the modules.

According to one further aspect of the invention, stepping the selected voltages of the modules enables that there are preferably always at least two module configurations for each voltage level to be output at the terminals of the series connection, so that the energy storage elements of the respective modules can be either charged or discharged. In other words and expressed for the operating state of a power output by the serial connection to a load, this is to enable a module in the inverted connection to be recharged, even though the same module in a preceding switched state was actively connected and discharged in the process. This is important because recharging cannot take place in the bypass mode or the disabled mode, respectively.

Figure 2:
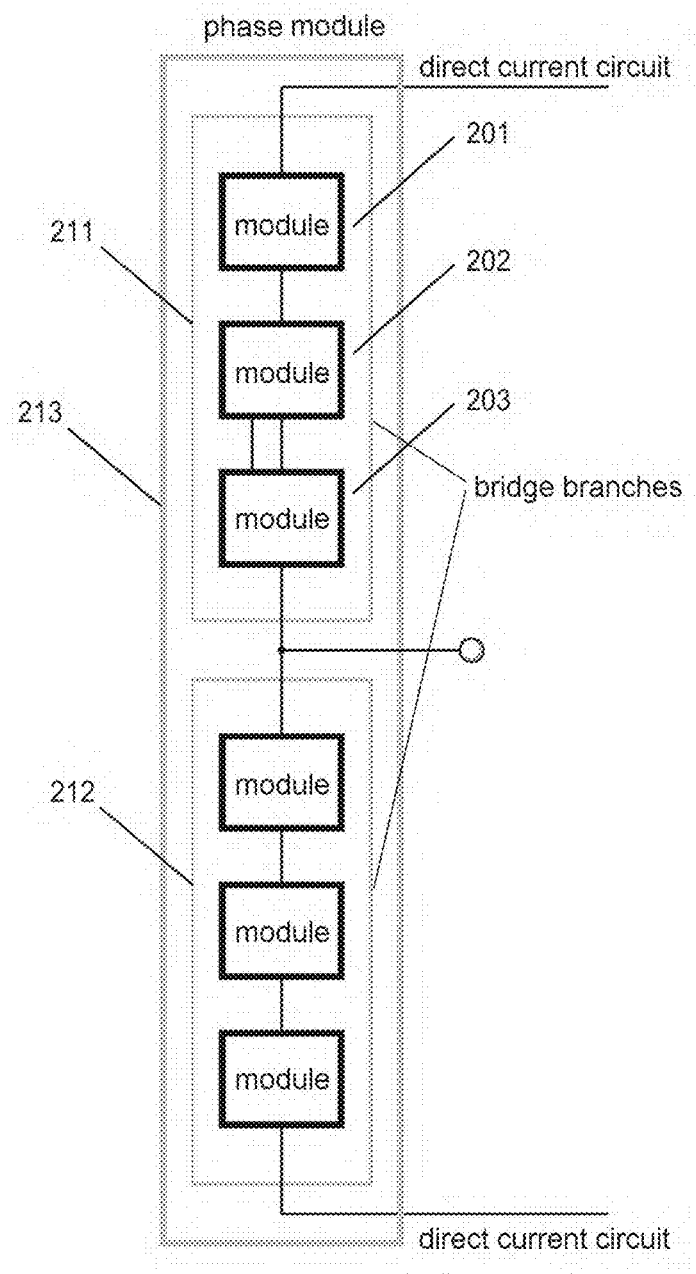
FIG. 2 shows a phase module of a conventional modular multilevel converter which is set up with two bridge branches with three equal two-terminal circuits each.

According to one further aspect of the invention, a direct current supply is thus coupled to a special module such that this special module at its terminals optionally delivers the voltage of the direct current supply, a bypass state or optionally the inverted voltage of the direct current supply. The further individual modules disposed in series with this particular switching module together with this special module form one phase of a single or multi-phase power converter, where the ends of this series connection represent the outer terminals for each respective phase. This aspect allows the configuration of power converters which are fundamentally different from conventional power converters with two bridge branches according to FIG. 2. In other words, the special module itself already forms one phase of a two- or three-level power converter, while the additional modules of the series are passively added and—unless switched to standby mode—supplied by the current through the series connection and furthermore increase the number of voltage levels that can be realized.

Figure 6A:
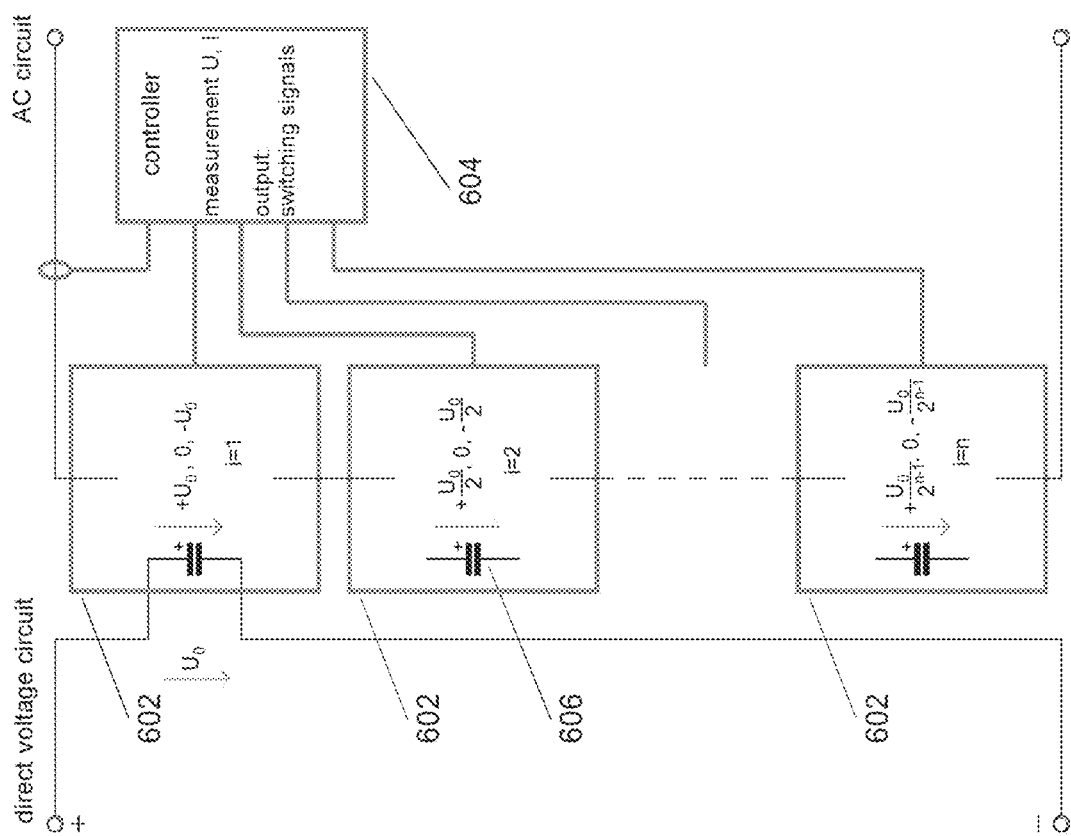
FIG. 6a shows a principle diagram to explain the basic principle of the present invention on the basis of a preferred embodiment.

FIG. 6*a* shows the principle configuration of a power converter according to this aspect of the invention. The power converter is formed by a chain of n modules 602 connected to each other in series. From an electrical perspective, the modules represent two-terminal circuits. Preferably, at least all n−1 modules are configured in the same way, except for the uppermost main module. The main module comprises terminals for applying a direct voltage U0. The modules comprise internal switching devices, preferably formed by transistors 620. These switching devices are controlled by a controller device 604. Controlling can be effected centrally, as shown. Alternatively or additionally, each module can dispose of its own control apparatus. Each module also comprises a storage device, such as a capacitor 606. The state of charge of at least each of the n−1 further module capacitors is detected or measured and thus monitored by the interaction with the controller device. By switching the switching devices of the modules at certain points in times in dependence thereof, the module voltage that can it can deliver in the active state to the voltage path can be maintained in a desired range for each module. According to the invention, the module voltages of the individual modules differ. Starting out from the main module with the voltage U0, each additional n−1 module preferably has a voltage reduced stepwise. The module voltages are preferably staggered relative to each other according to the powers of two, as indicated. The output is formed by the voltage at the endpoints of the series connection.

When switched to active operation, each module can deliver its module voltage to the voltage path. In bypass operation, the module is connected through and its module voltage is not introduced into the serial voltage path, when switched to a preferably intended inverted operation, each module can introduce its voltage inverted into the voltage path. It is clear to the person skilled in the art that this leads to a large number of voltage levels that can be realized at the output, achievable by a small number of modules. Switching the inverted operation allows the storage device of the corresponding module to recharge.

Further details shall be described on the basis of the further figures, where the controller device is partially not drawn in for reasons of simplification.

Figure 3:
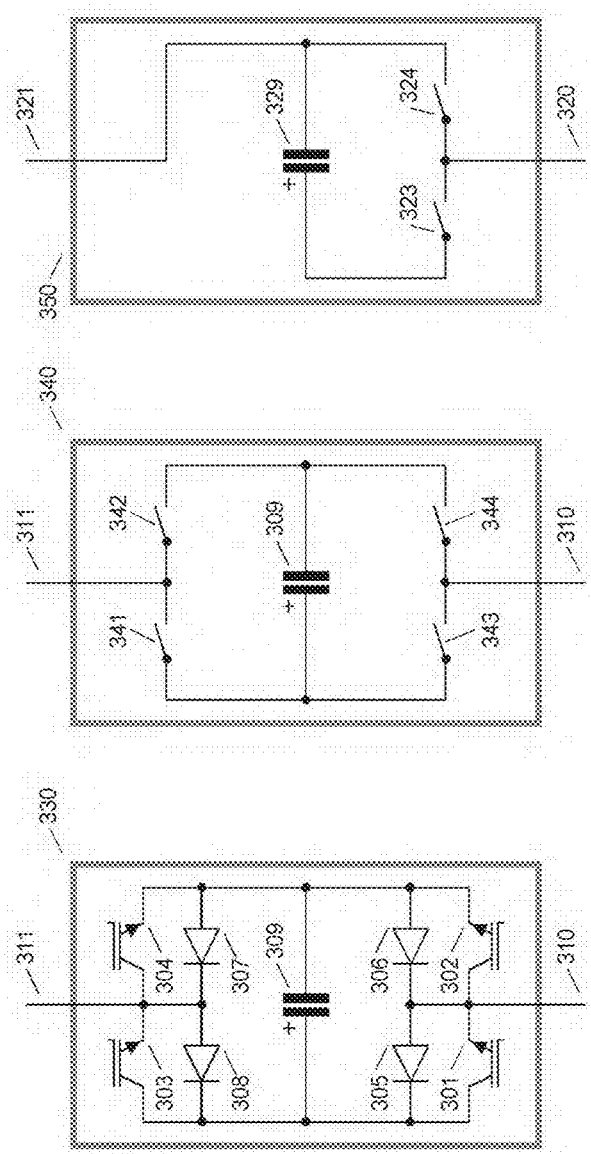
FIGS. 3a-c show the basic structure of a four-quadrant module or a two-quadrant module, respectively, as it can also be used for the present invention.
Figure 4:
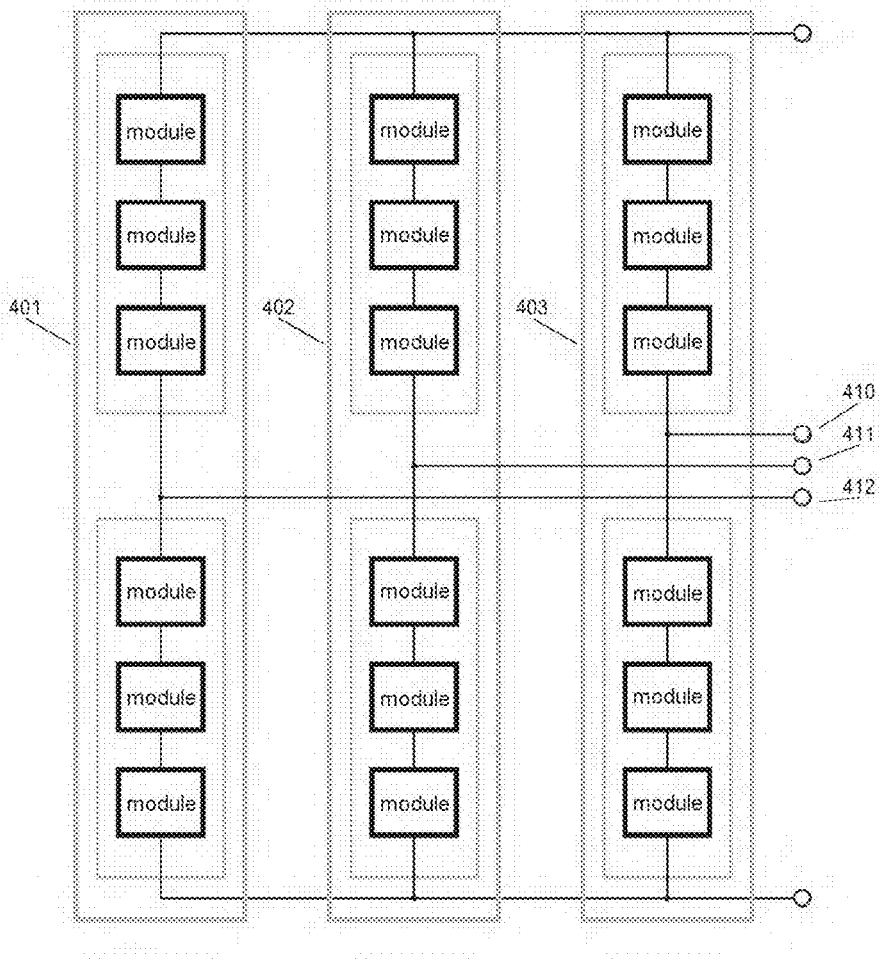
FIG. 4 shows a system for converting a three-phase alternating voltage into a single-phase alternating voltage or a direct voltage consisting of three phase modules connected together.
Figure 5:
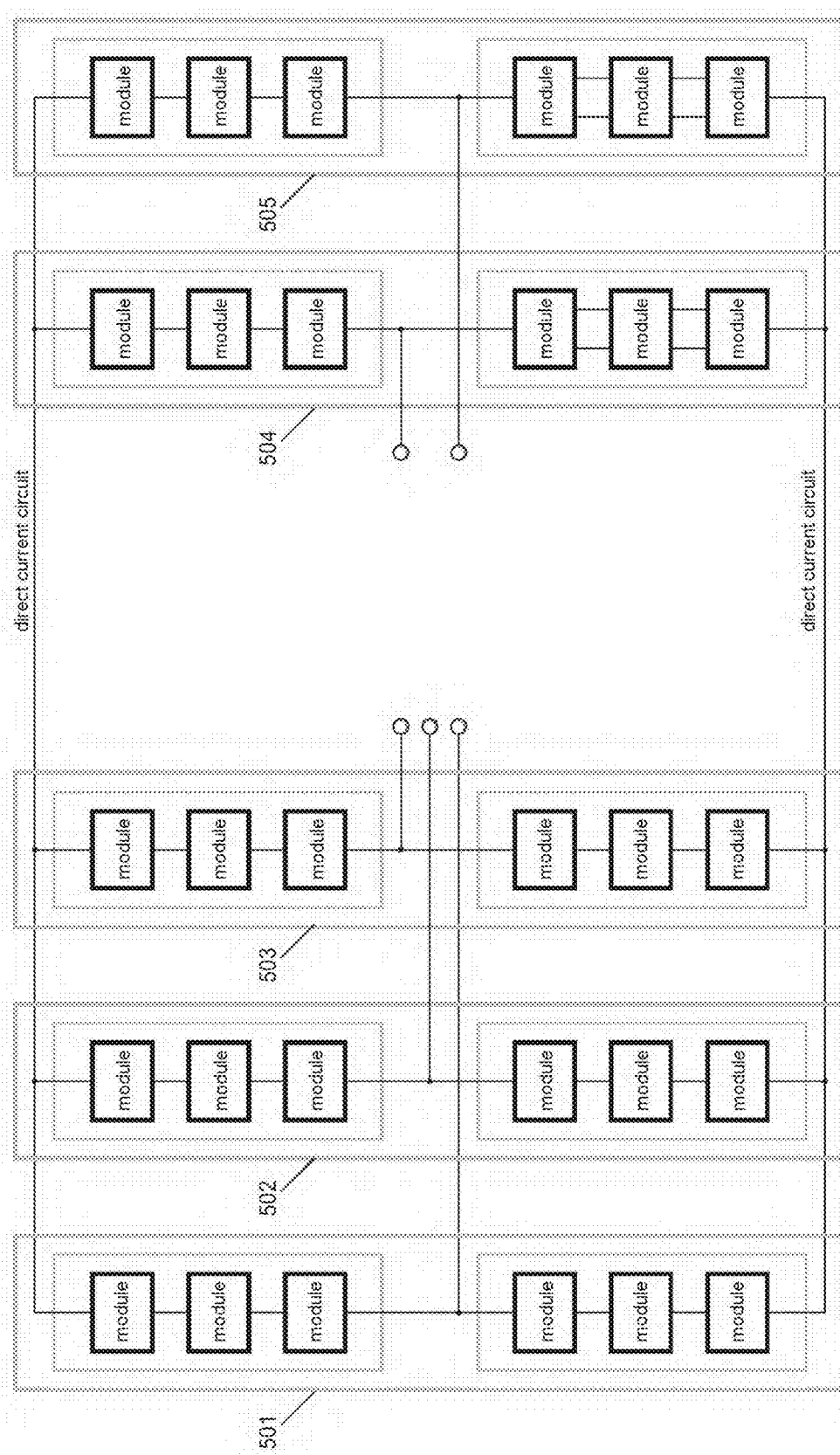
FIG. 5 shows a system for coupling a three-phase power grid with a two-phase grid consisting of three and two phase modules connected together.

The special module or main module fed by the direct voltage supply preferably represents the module with the highest voltage strength and can be considered as being an actively supplied module (or main module). The other individual modules connected in series can be configured as four-quadrant modules 330, 340 of a modular multilevel converter, as shown in FIGS. 3a and 3b. For example, MOSFETs or IGBTs can be used as transistors. Instead of transistors 301 to 304 shown, other electrically switching components can also be used as transistors, such as GTOs or IGCTs. Parallel to the switching components, diodes can also be connected in parallel so that they block the switching component in the respective forward direction.

The special connection according to FIGS. 3a and 3b enables that each individual energy storage element of the series connection is either added positively or negatively in series to the voltage source or is not involved in the form of a bypass connection. Selected energy storage elements (such as capacitors) of the series connection with different voltages are thereby serially or anti-serially switched to the voltage source. The two terminals at the ends of a chain thus formed are considered to be the output of the system. However, due to the bi-directional power flow, they can also act as inputs of the connection.

The energy storage elements are preferably charge storage devices, such as capacitors or batteries, which do not require additional supply to the outside. Furthermore, other energy storage elements, such as double-layer capacitors or lithium-ion capacitors, can also be used. By connecting these energy storage elements in series with the actively supplied modules and a load, the system can transport charge from the actively supplied modules—depending on the instantaneously selected polarity in the module—into the energy storage elements, or discharge it therefrom. In particular, with appropriate selection of the voltages of the storage elements and their connection, voltages $U0 \leq U \leq U0$ can thus be generated at the output terminals of the series connection, where U0 represents the voltage of the actively supplied module (this range applies at least where recharging individual modules is to be possible; without this requirement, almost twice the voltage range would be possible for a short period of time). The voltage at the output terminals is therefore the sum of the partial voltages of the modules switched active, i.e. the modules that are not in bypass mode. Since in particular the non-supplied modules are configured as four-quadrant modules, their voltage contributions can also be negative. The properties of the actively supplied module give rise to two basic possibilities for the series connection of the modules:

the actively supplied module is configured as a two-quadrant module; in this case, it can only output a positive voltage U0 or 0V. Accordingly, only a stepped voltage between 0V and U0 arises at the output terminals of the series connection, since the sum of the voltage contributions of the other modules is negative, as long as the voltage at the actively supplied module is U0. In this variant, the other modules can be configured as four-quadrant or two-quadrant modules.

the actively supplied module is configured as a four-quadrant module; in this case, it can output a positive voltage U0, a negative voltage −U0 or 0V. Accordingly, a stepped voltage between −U0 and U0—and thus a real alternating voltage curve can be output at the output terminals. In this variant, the other modules are likewise to be configured as four-quadrant modules.

The current at the output terminals of the system (which can be a load current or the current of a source) generates a charge transport through all modules, which in turn changes the voltages of the individual active energy storage elements over time. The voltage of a capacitor (which serves as the energy storage element of a module) drops over time when this capacitor is serially connected—according to the current polarity selected—to the voltage source, or its voltage increases when it is in an anti-serial connection with the source.

By constantly switching over the energy storage elements of all the modules involved (except for the module with the highest voltage strength) during operation, its mean charge and therefore its voltage can be obtained for each energy storage element. In particular, the modules to be activated can be chosen for such switching processes in such a way that reversing the polarity of the energy storage elements on the one hand balances the charge of each energy storage element in the desired manner (so that its voltage value is approximately maintained) and, on the other hand, the desired total voltage of the series connection of the modules is maintained. In this way, almost constant direct voltages can be realized or changed in small steps also at the output of the system by constant periodic switching.

Changing the output voltage by changing the configuration of modules switched active is at a very low loss, since only the conductance losses of the transistors of the modules, the ohmic losses of the energy storage elements, and possibly further switching losses of the transistors arise.

For stepping the voltages of the individual energy storage elements, it is shown that stepping at the powers of two is particularly advantageous. The energy storage element with the highest voltage is then configured for a voltage of U0; the voltage for the other storage elements is respectively halved. This configuration has the advantage that a large number of equidistant voltage steps can be created according to the method described above with relatively few energy storages. If one considers the supply from the voltage source as being an intermediate direct current circuit, interprets the actively supplied module as being a four-quadrant module by way of example and considers the output terminals as being an AC circuit (even if the system can optionally also generate direct voltages), the resulting system forms a single-phase power converter.

Single-Phase System:

The above basics apply mutatis mutandis to the further explanations, which are first geared toward a single-phase system.

Single-phase systems as a preferred embodiment are needed, for example, to generate a single-phase alternating current, for example, 230V/50 Hz from a direct voltage source. One possible application is in the field of photovoltaic. An energy storage system is charged over time by way of photovoltaic panels and is intended to supply a system, for example a house. The system house typically requires 230V/50 Hz. The power converter is there able to accomplish this conversion between the energy storage system and the house grid.

FIG. 6b shows such a system by way of example and schematically, consisting of four modules, each of which is configured as four-quadrant modules. It is clear to the person skilled in the art and in particular also from the above explanations that any number of modules may be present and that they can be switched by way of any type of switching devices. They can be configured as two-quadrant or four-quadrant modules A single-phase power converter 610 consists of four modules 640, 650, 660, 670, where each module is symbolically illustrated having four switches. Module 640 represents the actively powered module. Serially connected modules 650, 660, 670 following below are all configured as passive four-quadrant modules having a storage capacitor 652, 662, 672 each, where the voltages of modules 650, 660, 670 are each halved again, as indicated in FIG. 6a. For the four modules shown (one actively supplied module and three passive capacitor modules), the individual voltages are divided according to the values U0, U0/2, U0/4, U0/8. The output voltage can therefore be represented as stepped down in increments of eighths relative to the maximum voltage U0. The sequence of the modules with their respective voltages is there not fixed to the sequence illustrated. For example, the module with U0/2 could be the last in the series. Only the actively supplied module that provides voltage U0 is fixed. It preferably forms the first module in the series, but this does not necessarily have to be the case. Terminal pair 680, 681 represents the connections for the direct voltage system (e.g. battery). Output terminals 690, 691 form the AC circuit. With this system, a variable positive or negative voltage in the range of −U0 and U0 can be generated at the output terminals. The output voltage is typically an alternating voltage with the desired frequency and amplitude (e.g. 230V/50 Hz). However, due to the possibility of being able to recharge the module capacitors, a direct voltage on the output side can also be generated. The system can be used to deliver energy from the DC source and feed it into an AC grid as an alternating voltage via the output terminals. However, reverse operation is also possible, in which the AC grid charges the direct voltage source.

FIG. 6c shows a further embodiment with additional details. All modules are there configured as four-quadrant modules. Module chain 620 represents the power converter with transistors and the associated body diodes. Furthermore, corresponding controller circuit 622 is shown in module chain 620. This controller circuit serves to determine the required switching states of the modules and pass them on to the modules. For example, the voltages of the energy storage elements of all modules and the current flowing through the module chain are detected (it corresponds to the output current of the power converter which can be positive or negative due to the bi-directionality of the power converter). Based on the individual voltages of the energy storage elements and a comparison with a respective target voltage, the controller circuit decides for each individual module whether it is to be charged or discharged, provided it is not to be switched to the bypass state. From the predetermination of a desired instantaneous target voltage, which in turn is derived from a desired voltage curve and the polarity of the output current, the controller circuit can then determine the switching states of each module required for the desired voltage curve at the instantaneous point in time. Accordingly, it can then output the required transistor control signals (or generally switching device control signals) to all modules.

The modular configuration of the power converter in combination with the controller circuit enables a very high degree of flexibility of the power converter, since a large part of the operating strategy of the power converter is stored or can be stored in the controller circuit in the form of exchangeable software. In this way, the controller circuit can be easily adapted to different operating strategies of the power converter by respective reprogramming or parameter adjustment, respectively. For example, the voltage tolerance can then be determined according to which the controller circuit decides whether an energy storage element of a module is to be recharged or discharged. It can also be defined variably by way of such a control program whether a pulse width modulation at the level of a voltage step is to be applied in addition to the step functions. This can achieve a smoother curve of the mean output voltage; on the other hand, the switching losses increase in this way. The power converter can also be adapted to a changed voltage in the direct voltage circuit by appropriate reconfiguration, in which all target voltage values of the modules are adjusted accordingly. Furthermore, the controller circuit can be adjusted by way of its software in such a way that the power converter generates fewer voltage steps than would be technically possible. Such an operating strategy can, for example, reduce the switching losses of the semiconductors and the capacitor losses at high power converter output if the operation of the power converter allows operation with a fewer number of steps. Appropriate programming and reconfiguration of the controller circuit can also be effected optically or via radio so that no galvanic connection to the power converter or its controller must be established for this.

Part of the functionalities required for controlling the power converter can also be transferred to individual separate control units, each of which is directly connected to the individual modules. These control units can verify, for example, the states of charge of the energy storage elements, so that not the charging voltage but only the state of charge is reported to the controller circuit. Furthermore, the control units can assume safety functions and allow only certain switching combinations of the switching elements, or in the event of an error, put a respective module into the bypass state. Communication between these control units and the controller circuit can be effected, for example, via a potential-free bidirectional data channel. Here as well, data can be transmitted by radio or optically.

Module chain 630 in FIG. 6d symbolically shows the same modules having a length corresponding to their respective voltage in the sense of the powers of two (if chosen).

With a respective load current (or current from a source), the capacitors of the modules are discharged or charged depending on the polarity switched, which leads to a corresponding rise or drop of the capacitor voltage. Therefore, a module whose capacitor has, for example, discharged too far (i.e. whose voltage is by a small tolerance limit below a respective target value) in a next step is switched such that its capacitor is disposed reversed in the current path. In this way, the respective capacitor is recharged by the load current. However, since this measure changes the overall voltage, a different combination of modules must then be switched according to the desired target voltage, which, however, delivers the same output voltage. Details of this principle of recharging while maintaining the output voltage are explained in the context of FIGS. 14 and 15.

The operating principle can also be reversed; this means that electrical power is supplied to the output terminals and is delivered via the direct voltage circuit. The voltage supplied via the output terminals must there correspond at least to the voltage of the energy storage element with the lowest voltage (lowest power of two) (i.e. typically the lowermost module in a strictly staggered arrangement).

Figure 7:
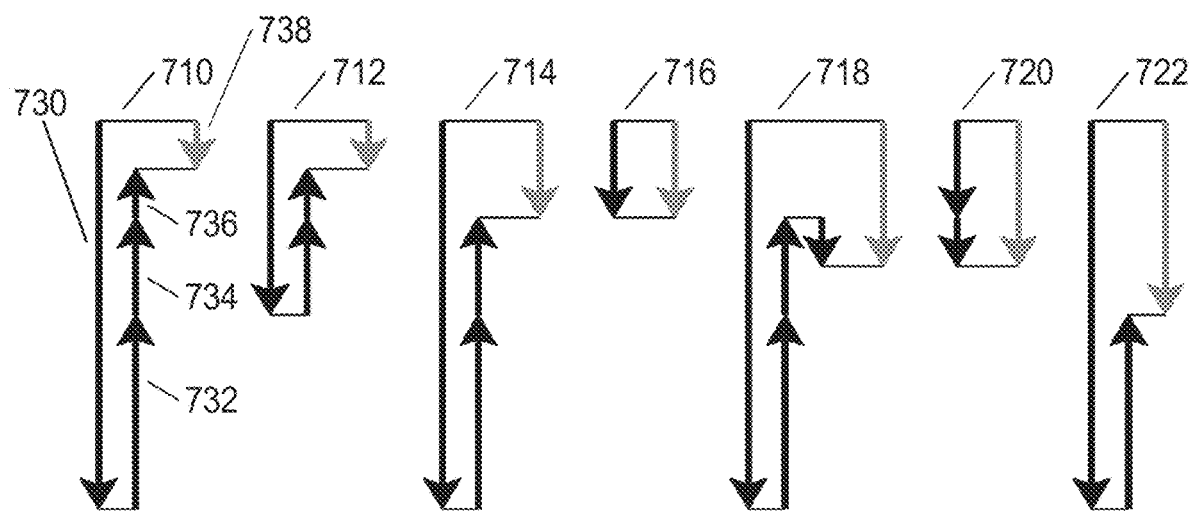
FIG. 7 shows an illustration of possible voltage combinations by activated modules for a single-phase power converter circuit consisting by way of example of four modules similar to FIG. 6.

Instead of a single actively supplied module or voltage source, respectively, several such actively supplied modules can also be connected in series FIG. 7 exemplifies possible different switching combinations of the four modules according to FIG. 6b with the aid of voltage arrows. The arrow length in this representation is selected proportional to the respective voltage. The black arrows symbolize the voltages of the instantaneously active modules; the grey arrow corresponds to the resulting output voltage of the system, i.e. the output voltage of the series connection of modules. Arrow 730 of switching combination 710 represents voltage U0 of the actively supplied module. In FIG. 7, modules 650, 660, 670 from FIG. 6b are all switched active, but have an inverse polarity. Accordingly, arrows 732, 734 and 736 are shown in the opposite direction.

The directions of the arrows at the same time allow for a conclusion regarding the direction of current flow. If a load is connected to the output terminals, a downwardly direction of the arrow corresponds to current output and an upwardly direction of the arrow corresponds to current take-up. In the present case, actively supplied module 640 is discharged, whereas modules 650, 660, 670 are charged. The resulting voltage, which can be tapped at terminal pair 690, 69, is represented by arrow 738. Accordingly, the voltage at the output terminals is positive and has a value of U0/8.

With switching combination 712 according to FIG. 7, the same output voltage of U0/8 as in the first configuration is generated. However, the actively supplied module is now operated in bypass, so that it does not deliver any voltage. Module 650 is now discharged, whereas modules 660 and 670 continue to be charged. Accordingly, there are also switching combinations, presently not shown, in which modules 660 and 670 can be discharged.

Figure 17:
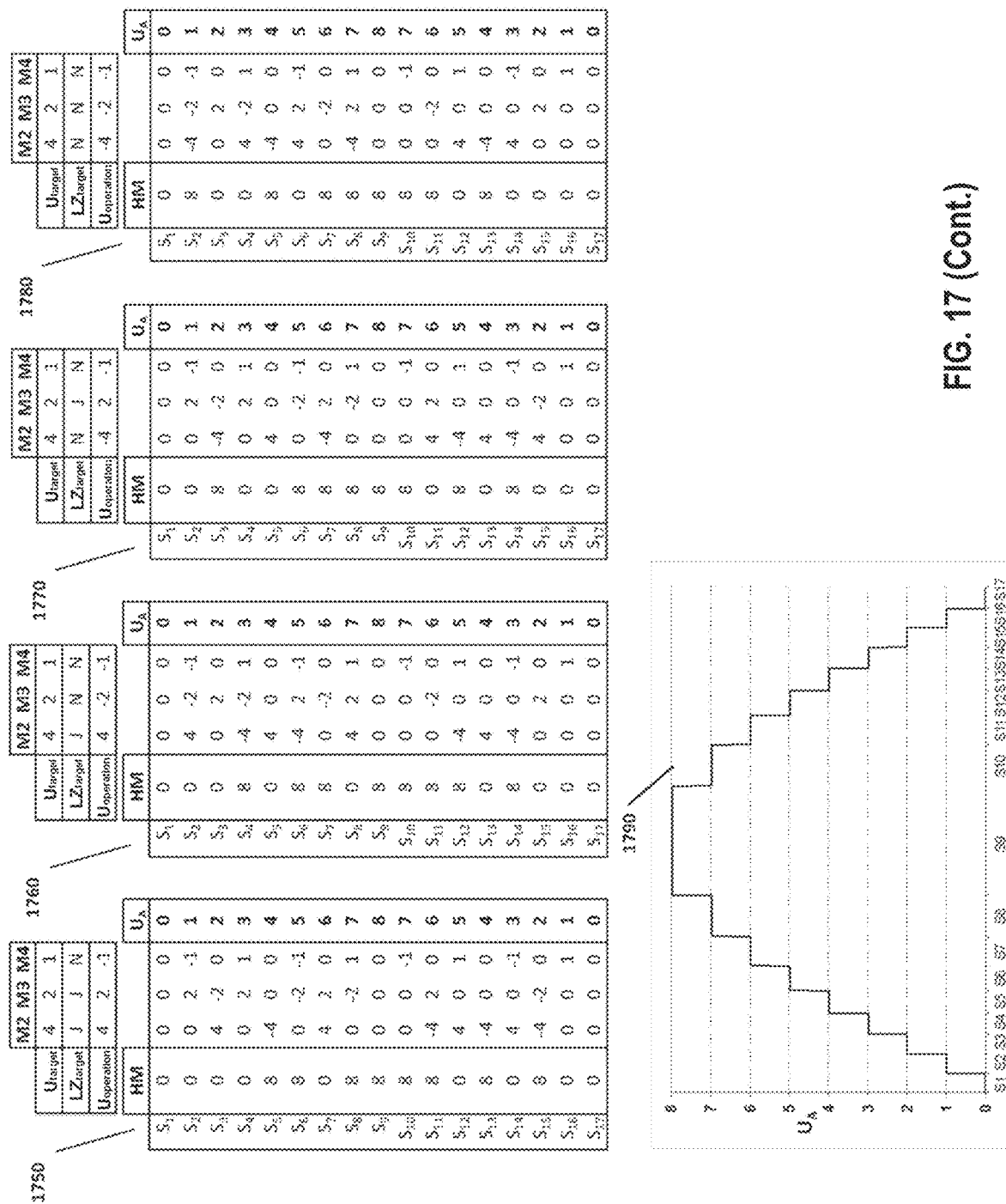
FIG. 17 shows sequences of switching steps as they are needed to create a stepped voltage curve.

This aspect shall be explained in detail in the context of FIG. 17. Switching combinations 714 and 716 each generate voltages of U0/4, switching combinations 718 and 720 voltages of ⅜ U0. A voltage of U0/2 can be generated at the output terminals by switching combination 722. When all arrow directions are reversed, respective negative voltages can be generated.

For a module chain consisting of an actively supplied module with voltage U0 and further n−1 four-quadrant modules (i.e. there are n modules in total), with module voltages stepped down according to the powers of two, the following connection can be shown:

Any voltage from −U0 to U0 can be realized in steps of U0/(2(n−1)) at the output terminals of such a module chain, regardless of the current state of charge of the individual energy storage elements (for example, capacitors) of the modules. State of charge presently means that the respective energy storage system for each module is either in a state that it should be charged (instantaneous voltage is below the target voltage for this module) or in a state that it should be discharged (instantaneous voltage is above or equal to the target voltage for this module). For example, since the voltage, when using capacitors as energy storage elements, continuously changes when charging or discharging, constantly switching back and forth between certain module configurations must occur—according to the states of charge of the module capacitors—in order to maintain a certain output voltage under load for a longer period of time. These specific module configurations together provide a consistent output voltage, but allow for the necessary recharging or discharging of certain module capacitors without this causing a noticeable change in the output voltage at the output. For realizing this output voltage, at least two module configurations therefore exist for each output voltage that can be realized—except for 0V (all modules in the bypass state), the maximum voltage U0 (only the actively supplied module provides voltage), and the minimum voltage −U0 (here the actively supplied module provides its inverted voltage). Further details on this principle shall be explained in the context of FIGS. 14 and 15.

Although down stepping down the module voltages according to the powers of two is preferred and allows maximum flexibility and simple controllability, stepping down differently is also conceivable, for example, according to the powers of three. However, unlike in the case of the powers of two, this can cause certain module voltages needing to be present two or more times.

Furthermore, in the event that several direct voltage circuits are available, configurations can also be used in which several actively powered modules are employed, each connected to a direct voltage circuit.

The frequency at which module configurations must be switched over is determined, firstly, by the permitted tolerance of the module capacitor voltages and their influence on the output voltage, the load current, and the capacity of the capacitors. In particular, very low switching frequencies can be obtained by using large capacities for the module capacitors, because the voltage changes occur more slowly. However, when alternating voltage is output, the frequency of this alternating voltage determines the minimum permissible switching frequency (i.e. due to the frequency to be realized and thus the increase in the step function, the point in time of switching must be significantly earlier than would actually be required electrically by the module capacitor). Conversely, the capacity of the capacitors and therefore the required capacitor volume can be greatly reduced—which apart from the filter costs is an important cost factor in power converters—in that the above process is specifically carried out with a relatively high switching frequency.

Furthermore, and in particular in the context of the above-stated, pulse width modulation can additionally be placed over the created step function by way of the modules. This is particularly useful where relatively large stepping increments arise due to a small number of modules. A further optimization can be obtained in the mean value by way of the pulse width modulation overlaid. Further details about this variant shall be explained in the context of FIG. 8b.

High switching frequencies also have the advantage that a filter circuit connected between the module chain and the load for smoothing the output current and voltage must store little energy (according to the voltage to be tapped and the duration of the period between the switching states) and can therefore be sized to be smaller. However, an increase in the switching frequency increases the switching losses of the transistors.

The above considerations for the generation of variable output voltages adjustable in steps can also be reversed, so that the circuit allows a power flow from the terminals on the right-hand side to the left hand side. The voltage applied to the terminals on the right hand side must only be slightly greater than the voltage of the module with the smallest voltage U0/2n−1. In this case, each passive module can then first be recharged equivalently and its energy be transferred into the actively supplied module (which is connected to the fixed direct voltage) and thereby feed into the direct voltage system via the terminals on the left hand side. In this case, it is true that a module, whose capacitor voltage exceeds a tolerance threshold due to the energy feed—when respectively changing the entire module configuration according to the voltage applied—is then switched inverted into the current path and discharged again.

In the single-phase system shown in FIG. 6, the output terminals have a system-inherent fluctuating potential relative to the input terminals. Therefore, for example, the minus pole of the left hand side may not be connected to one of the two output terminals of the right hand side. Solutions to this problem are explained below in the context of multi-phase systems and FIGS. 9 to 13.

According to one preferred embodiment, the main module is fed with a direct voltage U0 and, in the case of single-phase systems, this leads to output voltages in the range between +U0 and −U0. It is clear to the person skilled in the art, however, that output voltages which are in the range of almost +2U0 and −2U0 can also be realized under certain conditions, at least for a short period of time. In particular, these maximum voltages are obtained in that all modules are switched to active operation (U0+½ U0+¼ U0+⅛ U0 etc.) or all to inverted operation (−U0−½ U0−¼ U0−⅛ U0 etc.).

Rules for Setting Voltage Steps:

The following explanations discuss further preferred details and can be used analogously with the above principles and single-phase systems, as well as with the further systems described hereafter.

According to one aspect of the present invention, a stepped voltage can be generated at the output terminals of a single- or multi-phase power converter in that respective switching states for the corresponding modules of the power converter are set according to the following rules.

The system consists of
an actively supplied module with a voltage that can be switched on in an arbitrary manner and
additional four-quadrant modules which can be operated either with a positive or negative voltage, depending on the state of charge, or alternatively be switched to the bypass mode.

The combination of these modules is intended to map total voltage values up to the highest module voltage (i.e. the highest voltage that the actively supplied module can supply), which is several times the smallest module voltage (i.e. the voltage of the energy storage of a four-quadrant module with the smallest terminal voltage).

Any positive output voltage generated by a combination of exclusively positive module voltages (so-called basic states) can also be realized if only the possibility to be operated with a negative voltage value in addition to the bypass mode is given for any four-quadrant module (this statement does not apply to the maximum voltage U0, which can only be delivered by the actively supplied module and for voltage 0, at which all modules are operated in the bypass state). The resulting multiple realization of an output voltage enables a sequence of switching states in which discharged modules can be charged in one of the following switching states and charged modules can be discharged. This principle can also be used to change the switching state within a voltage step. The same applies to negative output voltages.

The above considerations relate to the case of energy discharge to a load. In the case of energy take-up from a source (e.g. braking process in an electric vehicle), negatively set modules are discharged and positively set modules are charged. This must be taken into account when switching the modules in order to obtain the actually desired state of charge.

The above-mentioned flexibility is based on the basic possibility to form a desired positive voltage value of a particular module (except for the actively supplied module), which is currently not available due to the state of charge of the respective module, by combining the positive voltage of the module with the next higher voltage in combination with the negative voltage (due to the state of charge) of the respective module. An example: if a voltage of 4V is desired in a chain of modules with the voltages 1V, 2V, 4V, 8V . . . , but this module is currently to be charged and therefore delivers −4V, a voltage of 4V can be obtained if a module with 8V is combined with the −4V of the respective module. This principle applies recursively, i.e. if this next higher module (e.g. 8V) is also available only negatively (i.e. −8V), then the balancing can be effected with the next higher module (here 16V): 16V−8V−4V=4V. Since the highest module is actively supplied, this module at the latest is always available for balancing. These considerations also apply to all negative voltages. Example: −4V=−16V+8V+4V. For example: −4V=−16V+8V+4V.

For a specific state in which the four-quadrant modules are available having any positive or negative voltage, the following method can be defined to determine the switching state of the individual modules and therefore for the balancing process any expressed as a rule can thus be distinguished the following cases for these balancing processes (stepping down the voltages of the energy storages in powers of two, assumed by way of example):

Starting with the lowest voltage value, the four-quadrant modules are connected according to the basic state in the bypass mode or with a positive voltage value.

If a four-quadrant module in the basic state was needed with a positive voltage value, but is connectable only with a negative voltage value due to the state of charge, then it is connected with a negative voltage value. The following four-quadrant modules are then added, switched according to the following rule:

If the four-quadrant module with the next higher voltage is not needed for a basic state, it is generally added.

In the case of a positive voltage state, voltage balancing is thus terminated.

In the case of a negative voltage state (inverted to the charge), the height of the voltage to be balanced is thereby doubled and must then be balanced with the module having the next higher voltage.

If the voltage of the four-quadrant module with the next higher voltage was needed for the basic state, then it is in this case generally operated in the bypass mode. This again doubles the requirement for the voltage to be balanced.

Since the requirement for the voltage to balanced is either balanced or doubled by way of the subsequent four-quadrant modules, final balancing is possible at the latest by the actively supplied module.

The same logic applies with the opposite sign for the generation of negative total voltages.

For example: If an output voltage of 6V is desired in the previously mentioned chain of modules with the voltages 1V, 2V, 4V, 8V . . . , then the basic state would be 2V+4V=6V; i.e. only the two modules for 2V and for 4V would need to be switched positive, all other modules are to be switched to bypass. If—deviating from the basic state—the 2V module is not available positive, then it is still needed (according to the above rules); therefore, it is added inverted. Furthermore, the next higher one, the 4V module is switched to the bypass state (since it was used according to the above rules for the basic state). The subsequent module in terms of voltage, the 8V module, is again added (since it is not needed for the basic state according to the above rules). In this case, the result would be: −2V+8V=6V. However, if the 8V module is also not available positive, it is still used—albeit inverted—and the next higher module is activated: −2V−8V+16V=6V. This can be continued if necessary up to the actively supplied module, which is always available.

Number of Adjustable Voltage Steps:

In the following, the number of possible adjustable voltage steps shall be examined, starting out from stepping down the voltages of the individual energy storage elements by the powers of two. The highest voltage step is not calculated as the summed up voltage of all n modules, but only the level of the actively supplied module. In binary notation, in which 1 describes a module added positively switched and 0 describes a module in the bypass mode, this would be the vector 10000, assuming 5 modules. The highest theoretically possible voltage would be 11111 in this case, i.e. all n modules in the same voltage direction in use—this case is usually not useful, however, since the modules for operation as a power converter can no longer be recharged as desired. With this vectorial representation (e.g. state 1; 0; −1), the switching behavior of all modules required for a certain output voltage can be well described. Switching the modules therefore corresponds to the change of the vector to the vector subsequent in the clock. Clocking and thus switching to the next module configuration is preferably effected regularly and at a frequency that is significantly above the frequency of the output signal to be realized. Depending on the output function to be realized and the storage capacity of the transistors, it can also be therebelow.

This results in the number S+ of positive steps:

$$S+=2n-1+1$$

This is the number of possibilities without the highest step and "+1" by the highest step. According to the representation following the binary system, zero is then already included. If one wanted to also take into account the number of possible negative steps S−, one would then have to omit step 0 accordingly, so that a total number S of obtainable voltage steps results in:

$$S=S++S_-=(2n-1+1)+2n-1=2\cdot 2n-1+1=2n+1$$

FIG. 8 shows the stepped curve of a sine voltage, as it can be output when outputting via a power converter according to one embodiment consisting of 5 modules. In total, the output voltage can be output in 33 voltage steps. The output voltage can then optionally be smoothed even further by filter circuits or further optionally by additional pulse-width modulated actuation of the modules, see explanations above.

Multi-Phase Systems:

All the above explanations apply accordingly for the multi-phase systems described hereafter, in particular regarding the basics and single-phase systems.

In a multi-phase system, the fact arises that the polarity of the module of the single-phase system actively supplied with current is constantly reversed and the output terminals therefore have no defined ground point in comparison to the DC connections of the input.

Figure 9:
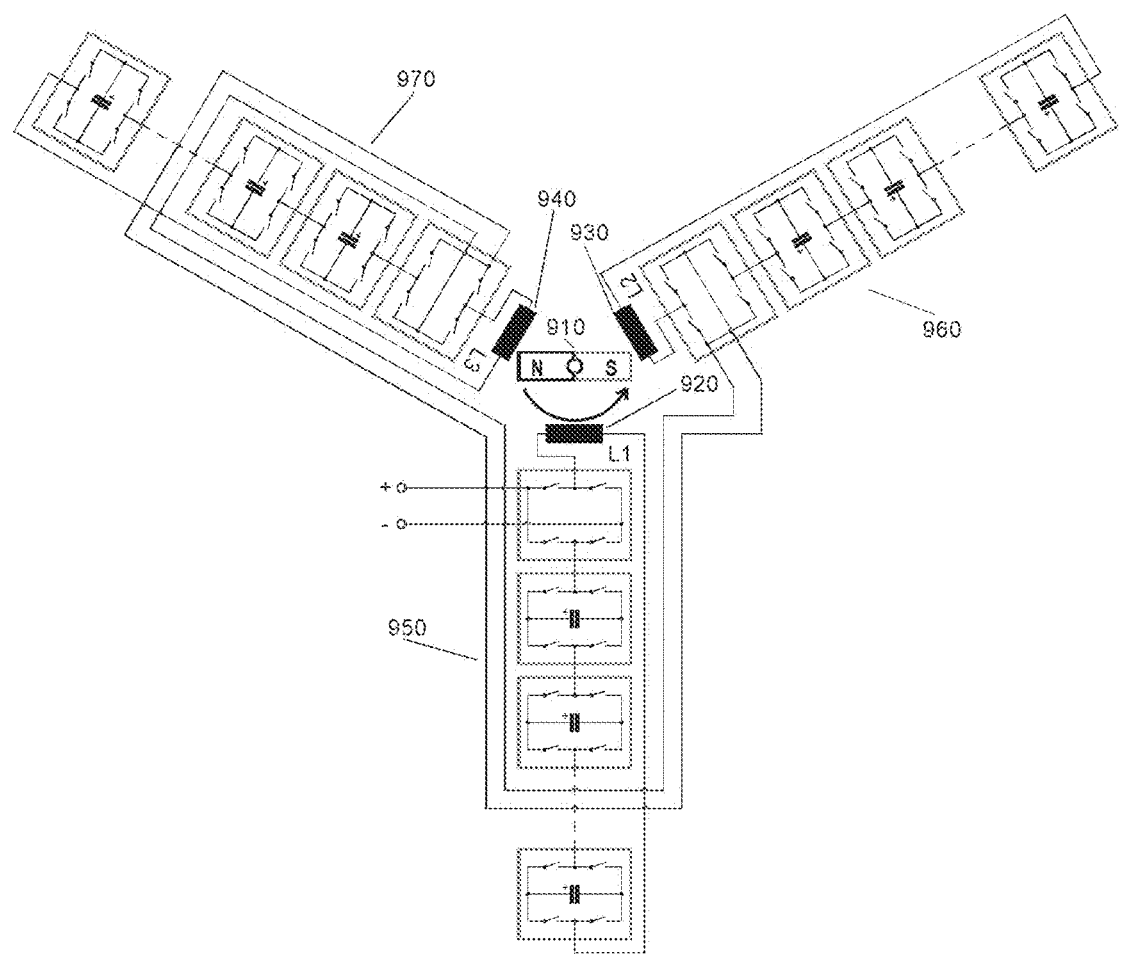
FIG. 9 shows the principle of supplying a three-phase consumer with separate insulated terminals via three single-phase devices according to a further aspect of the present invention.

When using multi-phase consumers or sources, where the individual phases can be operated in isolation against each other, i.e. which are also not connected as a star (e.g. transformers or motors/generators with insulated, non-connected windings), multi-phase power converter systems can be set up in which several such single-phase power converters according to FIG. 6 are connected via the direct voltage circuit. Such a system is shown in FIG. 9 for actuating a three-phase motor 910. The individual three windings 920, 930 and 940 of the motor are fed by three single-phase power converters 950, 960 and 970 in such a way that a rotary field is created in the three windings. It is there advantageous that the potential of the direct voltage can simply be reversed for each phase for generating the output voltage. Accordingly, with a voltage of U0 in the direct voltage circuit, a possible output voltage between +U0 and −U0 results for each phase (in contrast, the voltage at the terminals of a conventional power converter according to FIG. 1 would only cover a range of +U0/2 and −U0/2). The controller devices required for controlling the switching devices and for detecting the states of charge, the load current, the rotary field, etc. is not drawn in in this diagram for reasons of simplification.

If the output terminals are to refer to a common potential or a common reference point between input and output is required, then modified circuit topologies shall be proposed according to further aspects of the invention. The multi-phase system is set up similarly to the single-phase system with regard to the passive four-quadrant modules with their capacitors as energy storage elements, cf. above. Since the output terminals of all phases must refer to a common potential, an actively supplied module adapted thereto must be used there, which shall be described hereafter.

In the figures of the systems described hereafter, the voltage in the direct voltage circuit is formally represented as 2 U0, since they generate output voltages for the respective multi-phase systems which are each in the range of +U0 and −U0.

In a first embodiment in this regard, the direct voltage supply is configured in such a way that central tapping is provided. This central tapping represents "0V" at the input side as well as at the output side and can therefore at the same time serve as the neutral point of the output system.

The actively supplied module, hereinafter referred to as an actively supplied multi-phase module, must be configured such that the potential jumps back and forth between +U0 and −U0 depending on the voltage to be delivered.

Figure 10:
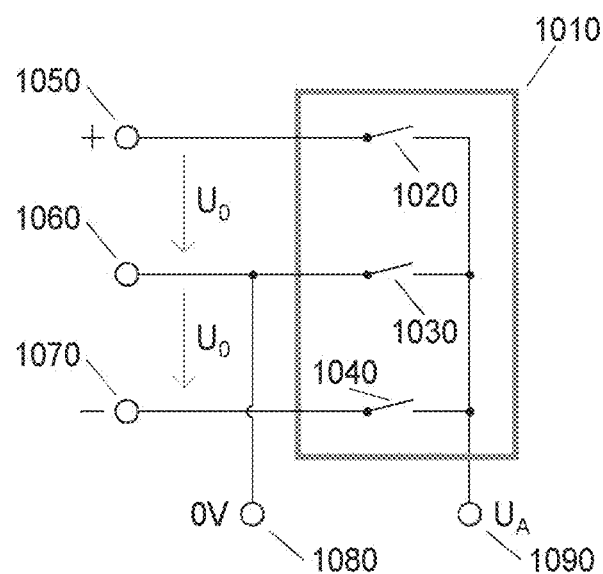
FIG. 10 shows a first embodiment of an actively supplied module for three phases of a multi-phase power converter according to a further aspect of the invention.

FIG. 10 shows a first embodiment for switching such a module 1010. The actively supplied multi-phase module shown (the other modules can be configured as described above) is needed for each phase of the multi-phase system to be set up. This principle can be implemented for any number of phases. The actively supplied multi-phase module according to FIG. 10 is supplied by a direct voltage power supply with the voltages +/−U0 via terminals 1050 and 1070 and central tap 1060. If this actively supplied multi-phase module is to pass a positive or negative voltage via its first output terminal 1090 to the subsequent four-quadrant module, then second terminal 1080 is respectively connected with "0V". This voltage potential corresponds, firstly, to the optional neutral point of the output and, secondly, to the central tap of the direct voltage supply. Depending on the desired state, one of three switches 1020, 1030 and 1040 is respectively to be closed. However, this schematic diagram poses two special demands for the switches. Uppermost switch 1020 and lowermost switch 1040 must be configured for a voltage strength of 2U0.

Furthermore, central switch 1030 must be able to block in both voltage directions. One such actively supplied multi-phase module is respectively required for each phase of the power converter.

Figure 11:
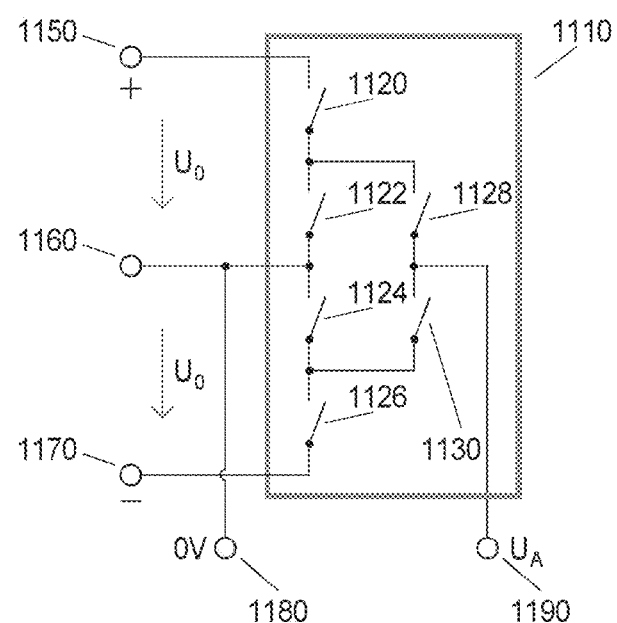
FIG. 11 shows a second embodiment of an actively supplied module for one phase of a multi-phase power converter according to a further aspect of the invention.

A second embodiment with similar properties is formed by circuit 1110 according to FIG. 11, where an actively supplied multi-phase module according to the circuit shown in FIG. 11 is needed for each phase. Here as well, voltages can be passed via direct voltage terminals 1150, 1160, 1170 via corresponding switches 1120, 1122, 1124, 1126, 1128, 1130 to output terminals 1180, 1190. Although it requires a total of 6 switches for every phase, these switches only need to be configured for half the voltage of the direct current circuit, i.e. only for U0. Furthermore, the switches used must only be able to block in one voltage direction. Therefore, IGBTs or MOSFETs can be employed there.

Figure 12:
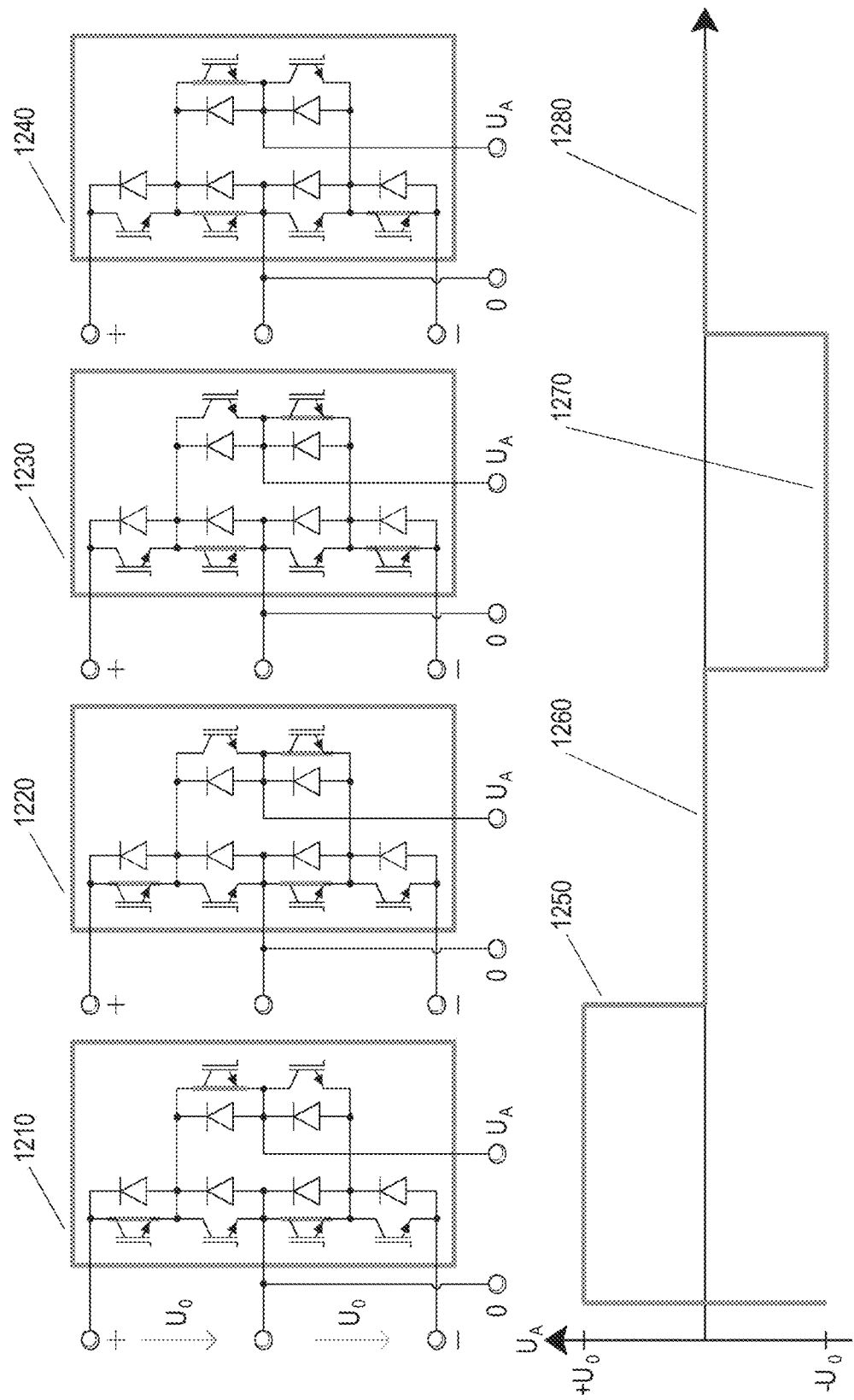
FIG. 12 shows possible switching states and the generated output voltages of the second embodiment for one phase within a multi-phase power converter.

FIG. 12 shows different switching states of the transistors of this second embodiment. The bars placed over the transistors are each to represent the transistors instantaneously switched to be conductive. Accordingly, first switching configuration 1210 generates a positive voltage at the output terminals, configurations 1220 and 1240 generate 0V and configuration 1230 generates a negative voltage. The circuit according to FIG. 12 can therefore also be considered to be one phase of a three-level power converter, which can supply the three voltage steps +U0, 0 and −U0.

Figure 13:
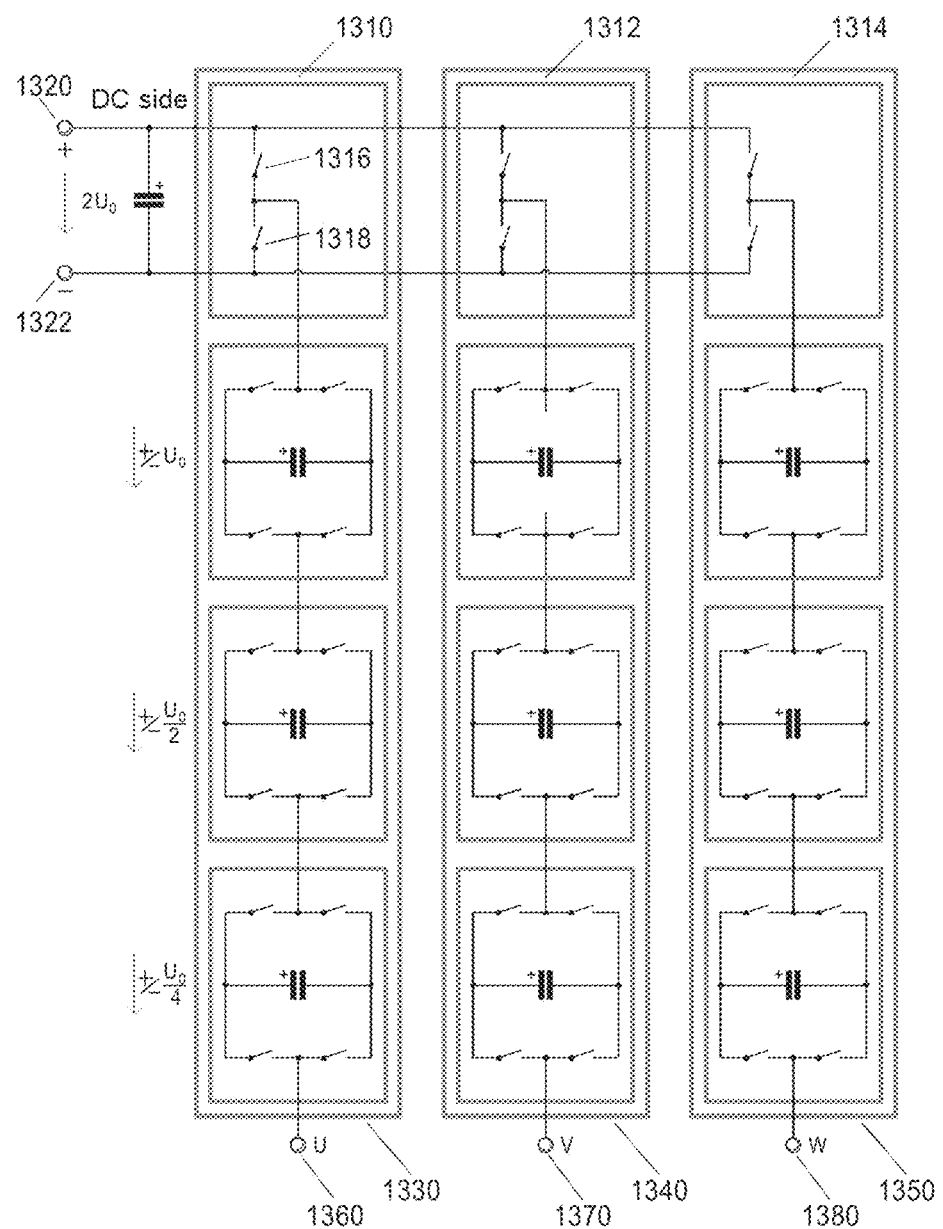
FIG. 13 shows a third embodiment of an actively supplied module for one phase within a three-phase power converter according to a further aspect of the invention.

If no neutral point is required in the multi-phase output circuit of the power converter, a third embodiment of the actively supplied multi-phase modules can be employed, as shown in FIG. 13. This embodiment uses a simple half-bridge consisting of two switches 1316, 1318 as an actively supplied multi-phase module 1310, 1312, 1314 for each phase, which can only switch between positive voltage 2U0 and 0V. FIG. 13 by way of example shows such a power converter with three phases and three additional four-quadrant modules for every phase, however, the principle illustrated can be applied to any number of phases as well as to any number of four-quadrant modules used for every phase. The positive connection of the direct current supply is connected to upper input terminal 1320, the negative connection to lower input terminal 1322. A single-phase power converter thus equipped can only output positive voltages between 0V and 2U0 at each output terminal of the power converter. Accordingly, the three chains 1330, 1340 and 1350 of the three-phase power converter shown in FIG. 13 can also generate only positive voltages against negative terminal 1322 of the direct voltage supply. However, the three outputs 1360, 1370 and 1380 can be controlled among each other in such a way that a symmetrical three-phase voltage system arises. Advantageous in this third embodiment is that only two transistor switches (or generally switching device) are required for every phase for the actively supplied multi-phase module, which in addition must be able to block only in one current direction. Accordingly, the upper three modules 1310, 1320, 1330 of the circuit according to FIG. 13 form a two-level power converter. If the direct voltage source, which is connected to input terminals 1320, 1322, additionally comprises a central tap, then the latter can also serve as a neutral point for the multi-phase output system. The essential difference to the embodiment according to FIG. 12 and FIG. 13 is therefore that the circuit according to FIG. 12 forms a three-level power converter, whereas the circuit according to FIG. 13 forms a two-level power converter. Accordingly, a further four-quadrant module is necessary for the embodiment according to FIG. 13 in order to obtain the same number of steps, as in the embodiment according to FIG. 12.

Generally speaking, according to a further aspect of the invention, a chain of four-quadrant modules can respectively be connected to each AC terminal of a single- or multi-phase two- or multi-level power converter such that this respective chain is disposed between the AC terminal and the single- or multi-phase load (or source). This chain (or these chains) then functions as a kind of filter circuit which accordingly increases the number of voltage steps of the power converter that can be output. The power converter system can therefore be divided into a two- or multi-level power converter and the associated chains of four-quadrant modules. Such a division can be advantageous, for example, for electric vehicles, since the associated power converter can there be used both for actuating the motor (or generator for recuperation operation) as well as for charging the battery (with high power). In such a case, in which the power converter connected to the drive battery, a connection can established via a switch at one time to the motor and at another time to the single- or three-phase AC grid. For actuating the motor, a simple voltage form of the output (e.g. block commutation or PWM actuation) with a two- or three-level power converter is often sufficient, whereas charging the battery via a single or three-phase AC grid must fulfill higher requirements in terms of the waveform of the voltage curve (due to possible circuit feedback). In such a case, the chains of four-quadrant modules only need to be disposed in the current path of the single- or three-phase AC grid and must only be configured for the corresponding charging power. For the operation of the motor, on the other hand, the simpler waveform of the two- or multi-level power converter can be used, whereby respective losses of the transistors of the module chains can be additionally saved.

Accordingly, grids with more than three phases can also be generated with additional power converter chains. By coupling two such single or multi-phase power converter systems—like a back-to-back converter—a power converter can also be set up which can process variable direct and alternating voltages with bidirectional power flow on either side. The connection of two such power converter systems is effected—similarly to conventional power converter systems—via the direct voltage circuit, which then becomes the so-called intermediate direct voltage circuit. In this way, any direct or alternating voltages (with any number of phases and frequency) can be converted into any other direct or alternating voltage.

Basically, all multi-phase power converter systems presented according to the first, second and third embodiment are suitable for such coupling. If the potential of the intermediate direct voltage circuit does not have to have a fixed relation to the alternating current systems, then the third embodiment according to FIG. 13 represents the most favorable option.

Switching Losses of the Transistor Switches:

Switching losses in the semiconductor switches employed are caused by the finite switching time in which a corresponding switch neither isolates nor conducts well and thus generates high ohmic power losses. These losses are therefore approximately proportional to the switched voltage, the switched current, the duration of the switchover, and the switching frequency. The highest voltage to be switched is applied at the module actively supplied by the direct voltage. However, the transistors of this module only need to switch half the voltage in comparison to a two-level power converter, namely the voltage of the supply circuit. Furthermore—in contrast to PWM power converters—a reduction of the switching frequency can be achieved by enlarging the module capacitors. In this case—when alternating current is delivered—the required switching frequency of the individual modules can be reduced approximately to the frequency of the alternating voltage output. If—as explained below—a switching threshold for the voltage for the transition charging/discharging is defined, then the resulting switching frequency is inversely proportional to the load current. As a result, both the witching as well as the conductance losses are reduced disproportionately with decreasing load current. This in turn leads to extremely high partial load efficiency.

All switching elements can be configured, for example, as transistors (for example, MOSFET or also IGBT) or other semiconductor switches and improved in the current carrying capacity by parallelization.

Simple Examples for Explaining in Detail the Principle of Charging and Discharging Processes:

The following explanations are only by way of example and serve to improve understanding. It is clear to the person skilled in the art that these explanations also apply to any number of modules, any type of storage elements, switching devices, any and in particular significantly higher input voltages and any output voltages to be realized.

The following exemplary explanations based on FIGS. 14 and 15 as well as 8b represent, firstly, special details, secondly, explain basic principles of the invention which also apply to all other figures and embodiments.

Example 1, Generating Direct Voltage with Two Modules

The power converter shown in FIG. 14 is initially to consist of only two modules, an actively supplied module 1410 (here embodied as a four-quadrant module) with 12V (which is supplied via terminals 1430, 1440 from the DC circuit) and a capacitor-based module 1420 which is configured for a voltage of 6V. Furthermore, the power converter is first to deliver direct voltage of 6 V at its output terminals 1450, 1460 (i.e. the voltage of the "smallest step"), where also a certain charge current is to flow. The initial configuration of the power converter is chosen in such a way that the 6V module is precharged with 6V. The 12V module can always deliver 12V due to its power supply.

Period 0 to t1, 1470:

The 12V module is first switched to 0 (bypass) (in which only the two transistors of this module on the right hand side or on the left hand side are switched on according to the figure).

The 6V module delivers the demanded 6V, where the module capacitor, however, discharges over time until a lower tolerance threshold has been reached. For example, if the voltage is below 5.9 V, the system must then switch over.

Period t1 to t2, 1472:

The 12V module is now switched active to +12V, while the 6V module with its reduced voltage of 5.9V is switched negative in series, for example, by connecting through the upper right hand switch and the lower hand left switch of this module. This results in a new total voltage of 12V−5.9V=6.1V, which—this time by charging the capacitor (which is caused by the charge removal from the negative pole of the capacitor)—slowly drops to the tolerance threshold again. Since the total capacitor capacity active in the circuit is not changed relative to the first period (since only one capacitor is electrically active; the further capacitor of the first stage added is electrically neutral, because it is always kept at full voltage due to the voltage supply), the speed of the voltage drop also remains the same (however, the time span doubles in comparison to the start, because the output voltage changes by 0.2 V from 6.1V to 5.9V). Due to the inverted operation, the 6V module is charged to a voltage of 6.1V.

Period t2 to t3, 1474:

Here again only the 6V module is positively active (the 12V module is in the bypass state again), but it starts with 6.1V, so that the third period is as long as the second.

In other words, the storage device of an active module is discharged due to the load current. During inverted operation, however, the load current leads to the respective module being charged, so that the resulting voltage range of this module can thus be kept within predetermined limits. If the state of charge at a storage device of a module threatens to drop below a limit value W1, then this module is switched in a subsequent phase to the inverted operation, which causes the storage device to recharge. This charging is then carried out up to the limit value W2, where the module at this point in time must then either be switched back to a discharge operation, i.e. active operation, or to bypass operation in order to prevent overcharging. In this way, each storage device of each module can be kept in a predetermined voltage range. This can be done electrically independent of the actual storage capacity of the module. The use of smaller capacities therefore requires more frequent switching operations than when using larger capacities, as recharging must be carried out at an earlier point in time. The capacities of the individual modules can be configured to be equal, although the modules are intended to provide different voltage contributions. However, they can also be matched to the voltage step assigned to them. However, all this must be taken into account when controlling the operating mode switching.

Example 2, Generating Direct Voltage with 3 Modules

The power converter shown in FIG. 15 is initially to consist of three modules, one actively supplied module 1510 with 12V (which is supplied via terminals 1540, 1550 from the DC circuit) and two capacitor-based modules 1520, 1530, one module for 6V and one module for 3V. The power converter is now to deliver direct voltage at 3 V at its output terminals 1560, 1570, where a load current flows again. The initial configuration of the power converter is there again chosen in such a way that the 6V module is precharged with 6V and the 3V module is precharged with 3V.

Period 0 to t1, 1580:

The 12V module and the 6V module are first switched to 0 or bypass. The 3V module delivers the required 3V, where the module capacitor, however, discharges over time until a lower tolerance threshold of, for example, 2.9V has been reached.

Period t1 to t2, 1582:

The 6V module is now activated and the 3V module is connected in series reversed. The initial voltage there is now 6V−2.9V=3.1V. This process continues until the total voltage has again dropped to 2.9V. At this point in time (assuming the same capacity of the module capacitors), the voltage of the 3V module has again risen to 3.0V: the voltage of the 6V module is now 5.9V. The voltage difference passed through is twice as high as in the first period; however, two module capacitors (e.g. of the same capacity) are now disposed in series, so that the time span is the equally as long as the first.

In other words, the capacity of two module capacitors acts in this phase in comparison to the previous phase in which only one module capacitor has acted. This results in a doubled voltage gradient. However, the entire charging phase is equally as long as in the first phase, since twice the voltage range has to be balanced. These considerations presuppose the use of the same capacitor capacities, which is a preferred embodiment due to the simplified switching processes. Of course, the capacities could be matched to the module voltages, which are stepped down, for example, according to the powers of two.

Period t2 to t3, 1584:

Since the 3V capacitor has now been charged to 3V again, a cycle like in the first period can again be used. At the end of this period, the 3V module capacitor is discharged accordingly to 2.9V.

Period t3 to t4, 1586:

Now both the capacitor of the 3V module as well as that of the 6V module is discharged. Therefore, these two module capacitors are switched anti-serially during this period, i.e. inverted to the 12V module. This results in a starting voltage of 12V−5.9V−2.9V=3.2V. Due to the two serially disposed capacitors, the voltage drops again as fast as in the second phase (the capacitor of the actively supplied module, which is also disposed in series, is electrically neutral due to the direct voltage supply, see the explanations above for the first example); however, the voltage stroke is slightly greater, as the voltage now drops from 3.2V to 2.9V. This results in an extended switching phase. When switching the switching devices of the modules, this must be taken into account by the controller device, presently not shown, which monitors the states of charge of the capacitors. At the end, the capacitor voltage of the 6V module according to the example is 6.05V and that of the 3V module is 3.05V.

Period t4 to t5, 1588:

The 3V module can now be activated again; the voltage drops from 3.05V to 2.9V.

Figure 8A:
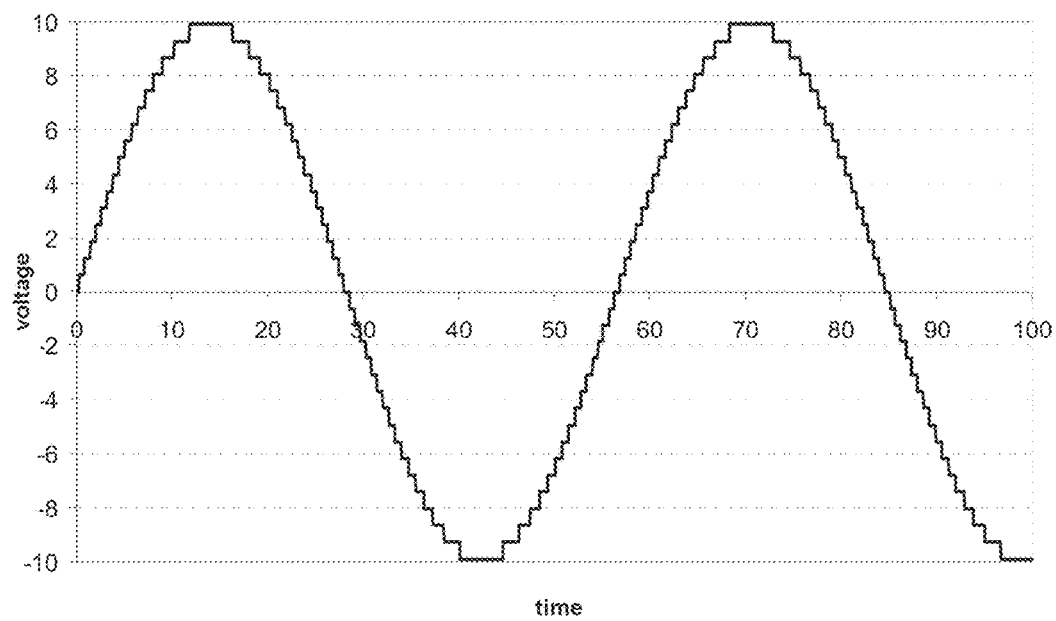
FIGS. 8a-b show illustrations of possible stepped curves of an alternating voltage, as they can be generated according to aspects of the invention.

According to these examples, the steps shown in FIG. 8*a* can be considered as a short-term direct voltage to be output. Therefore, such a voltage step can have quasi a substructure, if several charging and discharging cycles of modules are required during the period during which a voltage level is to be maintained. This is explained in more detail in FIG. 16.

Figure 8B:
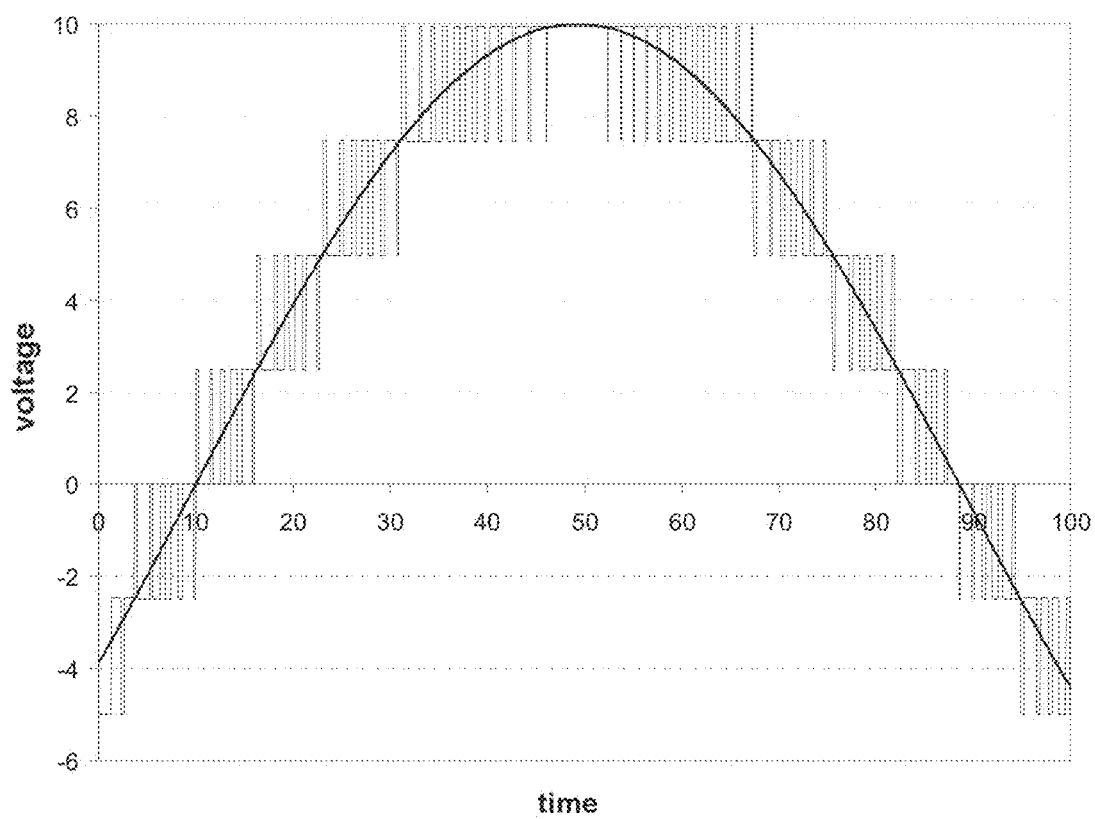

Furthermore, in addition to the homogenization of the voltage curve, a pulse width modulation with the voltage stroke of one voltage step can alternatively be controlled by way of the power converter, as shown in FIG. 8*b*.

The state vector is respectively indicated in FIGS. 14 and 15 at the top for each switching period and indicates which module in this module configuration must be in active operation ("1"), inverted operation ("−1") and standby ("0"). Ultimately, the switching behavior can be expressed by the succession of these state vectors and the controller device must be able to perform this switching behavior. For example, a sine at the output can be described by the sequence of suitable state or switching vectors, respectively. If, as shown in FIG. 8*b*, a pulse width modulation is applied, then the controller device must also be able to perform it by appropriately clocked switching on and off.

Figure 16:
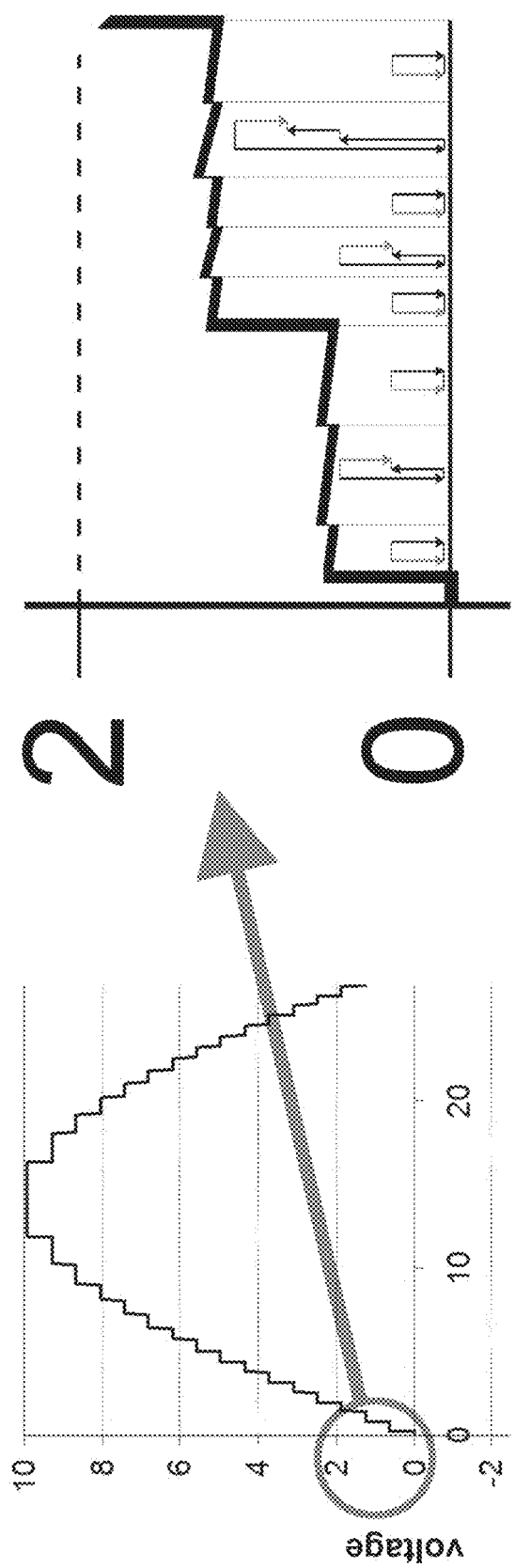
FIG. 16 shows an illustration of a step function with an enlarged section for generating individual voltage steps.

FIG. 16 makes it clear that, in particular, for a slowly rising output voltage, it may be necessary to maintain the same output voltage over at least two consecutive switching periods. The right side shows enlarged the circled curve section of the left side. During this section, switching occurs 8 times over time and the module configuration is thus changed. The output voltage level does not change for three periods, then it does not change at a higher level for 5 switching periods. While the output voltage is kept substantially constant for a short time in this way, the module configurations nevertheless change to allow for recharging switching devices that are discharged too much, as already explained in detail above.

The state vectors explained in the context of FIG. 15 which determine the switching behavior of the modules and lead to different module configurations which can deliver the same output voltage and thus enable recharging of individual modules, shall be explained hereafter in a more systematic way in the context of FIG. 17.

Example of Creating a Step Function for any Initial State:

FIG. 17, by way of example for the case of a load, shows the necessary switching states of a supplied main module (HM) in combination with three four-quadrant modules (M2, M3, M4) in order to stepwise map a positive output voltage UA of 0 V to the main basic module voltage of 8V and back to 0V with the step height of the smallest four-quadrant module. For example, a positive sine half wave could thus be generated, as is symbolically illustrated by 1790. The main module voltage there is 8V and the target voltages Usoll of the energy storage elements of the further four-quadrant modules (M1-M4) respectively are 4V, 2V and 1V. FIG. 17 illustrates sequences 1710-1780 of switching states S1 to S17 for all possible combinations of the initial states of charge LZsoll and therefore for all possible combinations of the possible initial operating voltages UBetrieb of the four-quadrant modules.

The term state of charge presently again means that the respective energy storage element of the respective module is either charged in such a way that it can be discharged with the next use, or that the voltage of this energy storage element is slightly below the target value and is therefore to be charged in one of the following cycles. Accordingly, two possible states of charge exist for each module: LZsoll=J ("Yes") means that the energy storage element may be discharged; for LZsoll=N ("No"), the energy storage element must be charged in one of the subsequent cycles.

For the case presently shown of a positive voltage and a load at the output of the power converter, this means that a four-quadrant module can there be added switched with positive voltage, provided that the state of charge LZsoll=J ("Yes") allows this, for LZsoll=N ("No"), the module can only be added switched with negative voltage—i.e. in the inverted state. It can be seen that a different switching sequence takes place for each possible combination of UBetrieb.

In the example shown, the state of charge of the corresponding energy storage element changes after each use of a module, so that each module after charging is discharged in one of the following switching states and vice versa. Of course, this is not necessarily the case, but is due to the capacity of the capacitor and the load current. Accordingly, depending on the capacity of the capacitor, either a (one-time or repeated) change of the switching sequence can be necessary during a single step or the case can also occur that the state of charge from one step to the next does not yet change.

For example, sequence 1710 starts with energy storage elements, all of which have the state of charge "J" while sequence 1780 starts with energy storage elements, all of which have the state of charge "N".

In any case, the actively supplied module in combination with one or more four-quadrant modules can balance negative voltages of connected four-quadrant modules.

According to the example shown, any step voltage can therefore be realized with any combination of states of charge of the energy storage elements. Of course, this also applies for any number of modules.

FIG. 17 therefore illustrates by way of a simple example the great flexibility achievable and that a certain output voltage can be obtained with completely different module configurations. In particular, this example illustrates the task of the controller, starting out from initial states of obtaining a desired course of the output voltage, to have different module configurations sequenced on each other over time.

Actuation of the Individual Modules:

Each individual module can be actuated, for example, by its own control unit, which is connected to a common controller device via a potential-free bidirectional data channel, in order, firstly, to control the switching elements and, secondly, to pass on the voltage values of the energy storage element to the controller device. Alternatively, other data, such as currents or temperatures of the components, can be transferred to the controller device. In particular, it is expedient to have the control units in the individual modules be electrically supplied by the controller device directly via the voltage at the terminals of the individual modules or via DC-DC converters. Data transmission to the common control unit can be effected, for example, optically or by radio, to ensure galvanic isolation. Alternatively, only a common controller device, or only module-related multiple individual control units can also be employed.

An Exemplary Control Algorithm for the Process of Generating a Stepped Voltage Curve for a Phase of the Power Converter is as Follows:

From k=1 to z:

For a given temporal course of the target voltage U(t) for discrete time periods tk (with tk+1−tk=Δt, length of the time period), form respectively possible stepped target values for the output voltage U(tk)

From j=1 to m:
i. For each sub-time period tj within a time interval Δt
ii. From i=1 to n
iii. For each of the z modules, determine the states whether
iv. $U_{Modul-i} < U_{soll-i}$ or $U_{Modul-i} > U_{soll-i}$
v. (from measurement or calculation)
vi. next i
vii. Determine the instantaneously required switching configuration $SK_{j,k}$ (from the respective rules) for all modules from the desired target value of the output voltage $U(t_k)$ and the states of charge of the modules
next j
next k.

Three loops are there nested in one another; the outermost loop runs from k=1 to z and describes the temporal sequence of the voltage steps to be created which are required to convert a desired voltage curve into a step function that can be represented by the power converter. The lengths Δt of the time periods may vary from step to step according to the control algorithm used. The second loop runs from j=1 to m and relates to the switching of module configurations within a voltage step. Such a temporal division of the step function is required, in particular where the module capacitors must be recharged already in the short time period of a single step, as shown for example in FIG. 16. With sufficient size of the capacitor capacities, this temporal division is not necessary, so that the activities of the outer loop and the middle loop can coincide. The third, innermost loop runs from i=1 to n (where n describes the number of modules) and determines the instantaneous state of charge for each module capacitor in order to decide whether the respective module should be switched for a subsequent state such that the capacitor is charged or is discharged (where several bypass states of this module may be disposed before this subsequent state).

Details on the Energy Flow Direction:

The above description is regularly based on the consideration that energy is delivered to a load via the terminals of the series connection of modules, for example, when operating an electric motor. However, it has already been established at various points that the present invention is also suitable for supplying a direct current source with energy, so that the energy flow takes place in the opposite direction, namely from the terminals of the series connection of modules into the direct voltage circuit. This is the case, for example, during the braking process of an electric vehicle in the so-called recuperation mode. In this case, the current direction reverses in comparison to the load case. If, therefore, in the case of a load from the perspective of the power converter—when a positive voltage is delivered—the current direction was previously out from the power converter (positive current direction), then it is reversed in the case of reversal of the energy flow direction. This means that the current direction becomes negative, while the positive voltage remains the same. The same applies in the case that the voltage at the output terminals is negative. In this case, the current direction is negative when a load is applied, while it becomes positive when the energy flow direction is reversed. Since the capacitors of the individual modules—provided they are switched to bypass operation—are disposed directly in this current path of the output terminals, the respective charge and discharge behavior of the switched capacitors (energy storage elements) is also reversed if the energy flow direction reverses. This means that a module capacitor that has been switched inverted is charged when current is delivered to a load, while it is discharged when the load flow direction is reversed. This must be taken into account by the controller device switching the switching devices (and accordingly ensuring that the voltage of each module capacitor remains within the voltage range predetermined). These considerations also apply mutatis mutandis to capacitive or inductive loads (or sources) where the current and the voltage are not exactly in phase. According to such a phase offset, the energy flow direction is constantly reversed according to the frequency of the alternating current. Therefore, having knowledge of the instantaneous values of the current and the voltage is helpful for the controller device of the power converter in order to determine therefrom the corresponding control signals for the individual modules.

Whether a system connected to the power converter (either via the terminals of the direct voltage circuit or via the output terminals) acts as a load or as a source can also be determined by way of the respective instantaneous values of the voltages between this system and the instantaneous values of the voltages of the power converter (assuming that the system is not yet connected to the power converter). If, for example, the instantaneous value of the voltage of the system is by a small value above the voltage of the power converter, then a current flow from the system into the power converter is to be expected. This—typically very small—voltage difference therefore determines the direction and magnitude of the current to be expected. Accordingly, the power converter (or alternatively an also controllable source) can determine the current or load flow direction, respectively. For example, by slightly raising the voltage in the direct voltage circuit (for example, to then charge a battery in the direct voltage circuit), the power converter can ensure that energy is fed into the direct voltage circuit. A motor/generator for direct current, which is supplied by the power converter with a voltage held constant to thereby generate a certain rotational speed, can be regarded as a further example. The voltage induced in the motor/generator is typically directly proportional to the rotational speed. At rotational speeds that are slightly below the target rotational speed, the machine will therefore operate as a motor and deliver torque (or mechanical energy, respectively). If the target rotational speed is slightly exceeded, then the machine transitions to generator operation; the torque changes its sign and mechanical energy is taken up. This consideration also applies analogously to rotary field machines that are operated with three-phase current. However, in addition to the voltage, the frequency of the three-phase current must there also be adjusted to the rotational speed of the machine.

Since the power converter outputs a stepped voltage curve, it must be taken into account—especially when using voltage steps of larger increments (i.e. power converters with few modules)—that these voltage steps also cause respective current changes according to the above considerations. Of course, this applies accordingly to all types of power converters, where in particular PWM-based power converters generate very strong voltage fluctuations. If the connected source or load does not exhibit a correspondingly flexible behavior to such voltage fluctuations (such as a motor/generator by way of the inductance of its windings), the use of additional filter circuits which smooth the current curve (or also the voltage curve, respectively) is useful.

Advantage of Preferred Embodiments of the Power Converter According to the Invention Over Conventional Modular Multilevel Converters:

In a conventional MMC-based power converter, 2n modules are required to generate a total of n voltage steps (of one polarity) for every phase module. For example, a three-phase power converter is to be supplied with a DC voltage of +/−320V (it could then generate output voltages of 230V~against ground). The voltage steps should have increments of 20V, whereby the output voltage can be represented in 16 positive voltage steps (or as a total of 33 step, see also FIG. 11)

With a conventional modular multilevel converter consisting of 2-quadrant modules, there would have to be 32 modules in each bridge branch having a voltage strength of 20V each: If a voltage of 0V is output against ground, then 16 modules each are also switched active in both the upper and the lower bridge branch (16×20V=320V) and 16 modules switched to bypass. If the maximum voltage of 320V is to be output, all 32 modules in the upper bridge branch are switched to bypass operation, while all 32 modules in the lower bridge branch must be switched active (32× 20V=640V). To output the maximum negative voltage of −320V it is exactly the other way around; here all modules of the positive bridge branch must be switched active and all modules of the negative branch to bypass operation. Therefore, a total of 2×3×32=192 modules are required for a three-phase power converter with this number of steps. For this purpose, 384 transistors, 192 module capacitors and (at least) 192 voltage levels (at least one each for every 2-quadrant module, since neighboring modules can possibly always share a voltage level) would be required to supply the transistor drivers.

A three-phase power converter according to the present invention, which is supposed to supply this output voltage, however, requires only 5 modules per phase, of which 3 are actively supplied modules (with, for example, 6 transistors each) and 4 are capacitor modules (with 4 transistors each). 15 modules are therefore required for the three-phase system. For this, 66 transistors, 12 to 15 module capacitors (the supply modules do not necessarily require a capacitor) and 36 voltage levels (two for each 4-quadrant module) would be required for the supply.

The total voltage strength of all transistors together is there equal twice the intermediate DC circuit voltage (for every phase) for both comp types of circuit compared. However, the new circuit can significantly reduce the component complexity. This reduces the costs for the power converter; in particular, the effort required to provide the potential-free supplies for the individual modules (e.g. via DC-DC converters) decreases. The above example therefore shows a case in which—in the case where the circuit according to the invention is used—conventional components (e.g. MOSFETs) can be used also for the voltage strength of the module with the highest voltage. This could be a three-phase power converter that converts an output of just under 10 kW at 10 A-DC for every phase.

Compilation of Other Advantages of Preferred Embodiments:

The circuit topology of the individual modules provides surge protection with regard to the inputs/outputs due to the energy storage elements and the diodes which are disposed parallel to the transistor switches (low pass effect).

Resistance against failure is provided due to possible use of redundancies by way of the controller (installation of additional replacement modules or change of operating mode so that modules assume the functionality of other failed modules).

The system is also DC-enabled at the output, it can therefore also provide an adjustable direct voltage.

When using suitable actively supplied modules, power converters can be set up for single- or multi-phase grids having any number of phases.

Two individual power converters can be connected via the direct voltage circuit in the form of a back-to-back converter and then transmit electrical energy of any voltage, frequency and number of phases bi-directionally from one power converter to the other.

A large number of equidistant voltage steps can be output at the output terminals with few modules (for n modules: 2(n−1))—while stepping down the module voltages according to the powers of two—in order to generate a finely stepped curve of the output voltage.

The system is bidirectional; i.e. energy can be delivered as well as supplied via the output terminals. In particular, a significantly higher voltage can be generated in the direct voltage circuit from a small voltage supplied (this property is, for example, very advantageous for the recuperation mode of electric vehicles at low speeds).

The capacity of the capacitors (general storage devices) is determined by the voltage drops tolerated during operation and by the switching frequency of the power converter; however, it is not dependent on the frequency of an alternating voltage output. If a switching frequency is selected correspondingly high, then the capacities of the capacitors can therefore be very small, which in turn allows for an extremely compact configuration of the power converter.

The capacitors are only used in one voltage direction, which means that electrolytic capacitors or accumulators can also be used in certain applications.

According to the finely stepped voltage curve, almost no filtering is often necessary at the terminals of the power converter. Furthermore, a filter circuit can take advantage of the fact that the power converter is constantly switched back and forth (and with a high frequency) between a slightly too large voltage step and a slightly too small voltage step (according to the voltage stroke of the module with the smallest voltage). The pulse width modulation therefore does not take place with the full voltage stroke in comparison to a conventional PWM power converter, but preferably only with the amplitude of the smallest step. Due to a possible high switching frequency and a small voltage difference to be smoothed, the filter circuit therefore has to store only a small amount of energy and can therefore be configured to be very small.

Continuous output voltages can be generated by adding an additional (e.g. in-phase) analog module. The voltage stroke of such an analog module must be only marginally greater than the voltage value of the module with the smallest voltage. Such voltages can be controlled in-phase relatively easily by power transistors, even for high currents. Alternatively, only the module with the smallest voltage can be operated as a PWM module to keep the switching losses low. Another alternative is to add a dedicated additional PWM module instead of the analog module. The voltage stroke of this module to be obtained must again be only in the voltage range of the module of the smallest voltage step.

For controlling in terms of the voltages of the individual modules, it must be verified only whether the latter is above or below a respective tolerance threshold, so that, for example, simple comparators can there be used in place of AD converters to measure the module voltage.

Alternatively, algorithms which draw conclusions about the voltages of the individual energy storage elements of the modules from the measured voltage and the current at the output terminals of the power converter can also be used for controlling. For this purpose, it is necessary, firstly, to take into account which modules are currently actively involved and, furthermore, to extrapolate the change in the voltage of the energy storage elements by way of the current measured. The voltages of the individual energy storage elements can then be calculated sufficiently precisely over a larger number of switched steps.

If the requirements for the accuracy of the voltage to be output allow, a corresponding power converter can also be operated in such a way that—starting out with the module having the smallest voltage—one or more modules can be switched to a pure bypass mode. In this case, the switchable voltage steps are greater (since only a smaller number of modules participate in forming the steps), but, firstly, the number of switching operations decreases significantly; furthermore, the capacitor losses of the bridged modules are eliminated. Such an approach can be advantageous, for example, for a vehicle power converter if it is used as a charger at the same time. In the functionality as a drive power converter, voltage steps of larger increments may be possible than in the functionality as a charger, because strict grid quality standards must there be adhered to. In extreme cases, the electric machine could even be controlled in a pure PWM mode (perhaps by only one module for every phase) (where the remaining modules can possibly be disposed only in the charging circuit). Furthermore, such a procedure can also be advantageous if the power converter is to deliver alternating voltages having very different amplitudes. If the amplitude is high, then the smallest steps could be omitted, whereas they are activated when small voltage amplitudes are output.

If the configuration of the voltage strengths of the modules allows, the system presented also allows for dynamic adaptation of the individual module voltages to special requirements. In this way, non-equidistant voltage steps can also be obtained, if necessary.

Selected Fields of Application:

Due to its features, such as simple scalability, this system offers an extremely wide field of application, ranging from low-voltage conversion, vehicle applications, to the high-voltage level (railway traffic, DC systems, grid couplings, power compensation, grid coupling of different voltages and frequencies, etc.).

MOSFETs can be used as switching elements, in particular for power converters of small and medium power for the low voltage range with voltages in the direct voltage circuit up to approx. 800V (for the module of the highest voltage step); IGBTs can be employed for voltages up to approx. 2000V. With a voltage in the DC circuit of UDC=+/−800V and a DC current demand of 50 A for each phase, such an power converter can have an output of approx. 3×800V×50 A=120 kW at a variable frequency and variable output voltage (in the range of 0 to 566V phase voltage or 980V phase-to-phase voltage). Such power converters are therefore suitable for low-voltage applications in which three-phase or alternating voltage is to be replaced with a low-loss local direct voltage system, as it is to be used more frequently, for example, in future distribution grids. For example, house connections with typical three-phase mains voltages can be connected to a local direct voltage grid.

The power converter presented is further suitable as a solar current converter. One such must convert direct voltage in a photovoltaic system to alternating voltage synchronized with the grid. At the same time, the direct voltage should be adjusted directly to the instantaneous output of the solar cells (maximum power point tracking). These functionalities can be ensured with the present system without additional direct voltage power converters or transformers.

A wide field of application also arises in the field of electro-mobility. The power converter is compact, causes less EMC interference, can be used both for driving the electric machine of electric cars and for charging the battery with very high power. In addition, it can also recuperate very well even at low rotational speeds or velocities without the need for an external DC/DC converter. It is also possible to couple two functionalities: In the driving mode, the machine can be actuated by PWM; charging is effected in the multilevel mode. Since many rail-based vehicles, such as trams are also supplied with direct current of a few kV, power converters according to the presented system can also be advantageously employed to control three-phase motors for the drive.

Furthermore, the presented power converters can also be used in wind turbines. The generator connected to the wind turbine there generates a three-phase voltage with variable frequency. The electrical energy is there fed either into a local direct current grid (e.g. in offshore wind farms) or directly into the local multi-phase alternating current grid. In the first case, a respective multi-phase power converter can be used which adjusts the output direct voltage to the direct current grid. In the second case, either a back-to-back converter can be used which converts the multi-phase alternating voltage of the wind turbine to a multi-phase alternating voltage of a suitable voltage and frequency and feeds it into the alternating current grid. Alternatively, a simple rectifier can also be combined with a power converter switched as an AC converter.

A further possible application of power converters according to the above-presented principle are high-performance audio amplifier systems: For good sound quality, a 16- or even 20-bit system is not realistic, because charging and discharging the individual modules cannot be accomplished with sufficient accuracy. However, with a 6- to 8-bit system in cooperation with an analog module, the required accuracy could be easily obtained, in that the output is returned via a respective controller and the analog module is controlled therewith. Controlling the power converter modules can then be derived directly from the signal values of the analog module, since this is fast enough so that the analog module does not exceed its voltage limit. The power requirement of the analog module is accordingly much smaller than that of the entire system. In addition, at such low voltages, the respective power transistors can be subjected to significantly higher currents without becoming unstable.

According to one aspect of the invention, a power converter is proposed:

a modular power converter for outputting different voltage levels, with at least one main module to be actively supplied having input terminals for the application of an input voltage U0 for the power converter, n−1 further modules, where n is an integer and n≥2 is true, all at least n modules are connected to each other in series, output terminals at both end points of the series connection, where at least each of the n−1 further modules comprises an energy storage device, preferably a capacitor for storing charge, and each module comprises switching devices, preferably formed by transistors, for optional and controlled setting of at least one active normal operation, in which the respective module introduces the voltage at its energy storage device into the voltage path of the series connection, and a bypass operation, in which the respective module only connects through the voltage path of the series connection, and preferably an inverted operation, in which the respective module introduces the voltage at its energy storage device inverted into the serial voltage path, a controller device for directly or indirectly detecting the states of charge of the energy storage devices of all n modules and for controlling the switching states of the switching devices of all n modules in order to be able to selectively set a specific operating state for each of the n modules for a certain point in time, where the controller device is configured such that the state of charge of each energy storage element of a respective module in the operation of the power converter is held substantially between predetermined limit values and in the active operation of the respective module thus leads to a predetermined voltage contribution into the voltage path and where the voltage contributions of the modules differ and are preferably stepped down relative to each other according to the powers of two, accordingly U0, U0/2, U0/4, U0/8 etc.

According to one aspect of the invention, a method is proposed:

Method for operating a power converter, where the power converter comprises at least one active main module with input terminals for the application of an input voltage for the power converter and n−1 further modules, where n is an integer and n >2 is true, where at least the n−1 further modules are preferably four-quadrant modules and at least each of the n−1 further modules comprises an energy storage device, preferably a capacitor for storing charge, and comprises switching devices, preferably formed by transistors, for optional and controlled setting of at least one active normal operation, in which the respective module introduces the voltage at its energy storage device into the voltage path, a bypass operation in which the respective module only connects through the voltage path of the series connection, and preferably an inverted operation, in which the respective module introduces the voltage at its energy storage device inverted into the voltage path, and where the method comprises the following steps:

connecting the n modules in series, applying a direct voltage U0 at the input terminals of the main module, predetermining a desired temporal course of the output voltage in relation to the amplitude over time, tapping the output voltage at the two endpoints of the series connection of the modules, maintaining predetermined states of charge for the individual modules in such a way that each module in its active operating state substantially makes a predetermined voltage contribution to the series connection, where the voltage contributions of the modules differ from each other and are preferably stepped down relative to each other to the powers of two, actuating the switching devices of the modules to switch each module to an operating state such that the sum of the individual module voltages as they are provided by the energy storage device of each module according to its active, inverted or bypass operation at all times corresponds to the predetermined range of the output voltage.

The invention claimed is:

1. Modular power converter for outputting different voltage levels, with at least one main module to be actively supplied having input terminals for the application of an input voltage U0 for said power converter, n−1 further modules, where n is an integer and n≥2 is true, all at least n modules are connected to each other in series, output terminals at both end points of the series connection, where at least each of said n−1 further modules comprises an energy storage device, preferably a capacitor for storing charge, and each module comprises switching devices, preferably formed by transistors, for optional and controlled setting of at least one active normal operation, in which said respective module introduces the voltage at its energy storage device into the voltage path of the series connection, and a bypass operation, in which said respective module only connects through the voltage path of the series connection, and an inverted operation, in which said respective module introduces the voltage at its energy storage device inverted into the serial voltage path, a controller device for directly or indirectly detecting the states of charge of said energy storage devices of all modules and for controlling the switching states of said switching devices of all modules in order to be able to selectively set a specific operating state for each of said modules for a certain point in time, where said controller device is configured such that the state of charge of each energy storage element of a respective module in the operation of said power converter is held substantially between predetermined limit values and in the active operation of said respective module thus leads to a predetermined voltage contribution into the voltage path and where said voltage contributions of said modules differ and are preferably stepped down relative to each other according to the powers of two, accordingly U0, U0/2, U0/4, U0/8 etc., where at least one alternative module configuration exists for each module configuration that is currently predetermined by switching said individual switching devices of said modules and the resulting output voltage, with the exception of the module configurations for maximum (U0), minimum (−U0) and zero (0) output voltage, and that can be set and substantially leads to the same output voltage, where switching to this alternative module configuration allows modules, which are to be recharged for maintaining their desired state of charge, to be switched to the inverted operating state as part of said alternative module configuration and without changing the resulting output voltage level, in order to thus enable recharging said respective module while maintaining the same output voltage level.

2. Power converter according to claim 1, characterized in that said energy storage devices are formed by capacitors and the charging constant of said capacitors used is small in comparison to the cycle time of said output voltage and excessive discharge of the capacities is avoided by repeated module configuration changes for every output voltage level, in that individual capacitors are discharged as well as recharged during a constant output voltage level.

3. Power converter according to claim 2, characterized in that the switching frequency of the module configuration change is great in comparison to the output voltage frequency, in order to allow several configuration changes for every output voltage level.

4. Power converter according to claim 1, where at least said n−1 further modules are configured as four-quadrant modules having a normal operation, bypass operation and inverted operation and the voltage contributions of all modules are stepped down relative to each other according to the powers of two.

5. Power converter according to claim 1, where said modules are connected to each other in a staggered manner such that a connection in the sequence of said respective realizable voltage levels is obtained.

6. Power converter according to claim 1, where said modules are sized according to their assigned voltage contribution, in particular with regard to their storage device.

7. Power converter according to claim 1, where a direct voltage U0 is applied at said input terminals and an alternating voltage in the range [−U0,+U0] at said output terminals, which, controlled by the switching behavior of said modules and the switching steps achievable with them, can assume almost any frequency, preferably including the possibility of realizing a direct voltage at said output.

8. Power converter according to claim 1, where said controller device is programmable to effect different power converter functions according to the requirements, for example, the desired driving behavior of an electric car.

9. Power converter according to claim 4 with a main module and n−1 further modules, where the number of representable steps in the output signal is 2n+1.

10. Power converter according to claim 1, where a certain output voltage at the output can be held for any length of time, almost independent of the actual electrical properties of said storage devices of said modules, in that the module configuration suitable for this specific output voltage range is switched back and forth with a switching frequency high enough to ensure that each module is recharged early enough by way of its inverted operating state before it is possible for said output voltage to leave the desired range due to the excessive discharge of individual modules.

11. Power converter according to claim 1, where at least all further n−1 modules are configured equally, preferably additionally also said main module.

12. Power converter according to claim 1, where changing the switching states of said modules takes place by way of a common predetermined clock and the predetermined clock is tuned to a desired output frequency of the voltage and the charging characteristics of said energy storage devices of said modules.

13. Power converter according to claim 1, where the detection of the states of charge of each module is carried out by said controller device, and this detection is effected either directly at said respective module or on the basis of the output voltage and the instantaneous switching state, preferably also the previous switching state of said modules, as well as the load current.

14. Power converter according to claim 1, with a filter device that is connected between said outputs of said power converter and the load to be applied.

15. Power converter according to claim 1, comprising several phases formed from several corresponding module chains, where each phase of said power converter is connected to a phase of a load or a source.

16. Power converter according to claim 15, where said load is a three- or multi-phase electric motor and said source is a three- or multi-phase generator, respectively.

17. Power converter according to claim 15, where said main module of each phase is configured as a multi-phase module and comprises a terminal for a central tap of said direct voltage supply, where this voltage potential can correspond to the neutral point.

18. Power converter according to claim 17, where said multi-phase module comprises 6 switching devices, preferably formed by transistors.

19. Power converter according to claim 1, characterized in that the module configuration is changed for each voltage level, other than the maximum voltage level, the minimum voltage level and for zero voltage, at least twice, preferably multiple times and particularly preferably between 5 and 15 times, preferably about 10 times for each voltage level.

20. Power converter according to claim 19, characterized in that a certain voltage level can be maintained for any length of time and said capacitors of all module configurations used for this purpose are regularly recharged by way of the respective inverted operation.

21. Power converter according to claim 19, characterized in that said capacitors used can have a relatively small capacity in that the switching frequency with which said module configurations are changed and thus recharging is carried out, is high in comparison to the frequency of the output voltage frequency to be realized.

22. Power converter according to claim 21, characterized in that the charging time of said capacitors is shorter by a factor of 100, preferably be a factor of 1000 than the period duration of the output voltage to be realized.

23. Power converter according to claim 1, comprising two similar power converters connected to each other via their direct voltage circuits for AC/AC conversion.

24. Power converter according to claim 15, wherein the power converter is coupled to an electric motor.

25. Power converter according to claim 1, wherein the power converter is part of an electric vehicle, with a battery device, and an electric motor.

26. Power converter according to claim 1, wherein the power converter is part of a system for converting an alternating current supplied via a power line to direct current for the local supply of a building cluster with direct current.

27. Power converter according to claim 1, wherein the power converter is part of a wind turbine.

28. Power converter according to claim 1, wherein the power converter is part of a photovoltaic system consisting of a photovoltaic power generating device, a battery device, a controller device for controlling the charge of said battery device by way of the electricity generated, the power converter being coupled to said battery device by way of said input terminals of its main module and to provide an alternating voltage with adjustable frequency at the output of said power converter.

29. Method for operating a power converter, where said power converter comprises at least one main module to be actively supplied having input terminals for the application of an input voltage for said power converter and n−1 further modules, where n is an integer and n≥2 is true, where said at least the n−1 further modules are preferably four-quadrant modules and at least each of said n−1 further modules comprises an energy storage device, preferably a capacitor for storing charge, and comprises switching devices, preferably formed by transistors, for optional and controlled setting of at least one active normal operation, in which said respective module introduces the voltage at its energy storage device into the voltage path, a bypass operation, in which said respective module only connects through, and an inverted operation, in which said respective module introduces the voltage at its energy storage device inverted into the voltage path, and where the method comprises the following steps:
connecting said n modules in series,
applying a direct voltage U0 at said input terminals of said main module,
predetermining a desired temporal course of the output voltage in relation to the amplitude over time,
tapping the output voltage at the two endpoints of the series connection of said modules,
maintaining predetermined states of charge for said individual modules in such a way that each module in its active operating state substantially makes a predetermined voltage contribution to the series connection, where said voltage contributions of said modules differ from each other and are preferably stepped down relative to each other by the powers of two,
actuating said switching devices of said modules to switch each module to an operating state such that the sum of the individual module voltages as they are provided by said energy storage device of each module according to its active, inverted or bypass operation at all times corresponds to the predetermined range of the output voltage, where at least one alternative module configuration exists for each module configuration, that is currently predetermined by switching said individual switching devices of said modules and the resulting output voltage, with the exception of the module configurations for maximum (U0), minimum (−U0) and zero (0) output voltage, and that can be set and substantially leads to the same output voltage, where switching to this alternative module configuration allows modules, that are to be recharged for maintaining their desired state of charge, to be switched to the inverted operating state as part of said alternative module configuration and without changing the resulting output voltage level, in order to thus enable recharging said respective module while maintaining the same output voltage level.

30. Method according to claim 29, characterized in that said energy storage devices are formed by capacitors and the charging constant of said capacitors used is small in comparison to the cycle time of said output voltage and excessive discharge of the capacities is avoided by repeated module configuration changes for every output voltage level, in that individual capacitors are discharged as well as recharged during a constant output voltage level.

31. Method according to claim 29, characterized in that the switching frequency of the module configuration change is great in comparison to the output voltage frequency, in order to allow several configuration changes for every output voltage level.

32. Method according to claim 29, where maintaining predetermined states of charge of the modules is achieved in that said respective module is switched to its inverted operation after a module voltage drop below a predetermined first value has been detected, in order to enable recharging and, if a predetermined second value of the module voltage has been exceeded, is switched to either active operation or standby operation in order to maintain a predetermined voltage range.

33. Method according to claim 29, where all modules are switched at the same times.

34. Method according to claim 29, where an output voltage is maintained substantially unchanged over at least two consecutive switching periods within one step, but for this purpose two different switching configurations for the modules are consecutively used in order to switch at least one module, which was in active operation during the first switching period, to inverted operation in the second period, in order to be able to recharge this module despite a substantially constant output voltage.

35. Method according to claim 29, where said power converter delivers an adjustable, constant output direct voltage with changing module configurations in that the resulting output voltage is not changed.

36. Method according to claim 29, where the module voltages of said n modules are staggered according to the powers of two for realizing the voltage values U0, U0/2, U0/4 . . . U0/2n−1.

37. Method according to claim 29, where a pulse width modulation is additionally applied over the switching states of the modules for further smoothing the output voltage.

38. Method according to claim 29, where two such power converters are connected to each other via their direct voltage side for obtaining AC/AC conversion.

39. Method according to claim 29, where said power converter is employed as a DC/DC converter.

40. Method according to claim 29, characterized in that the module configuration is changed for each voltage level, other than the maximum voltage level, the minimum voltage level and for zero voltage, at least twice, preferably multiple times and particularly preferably between 5 and 15 times, preferably about 10 times for each voltage level.

41. Method according to claim 40, characterized in that a certain voltage level can be maintained for any length of time and said capacitors of all module configurations used for this purpose are regularly recharged by way of the respective inverted operation.

42. Method according to claim 40, that said capacitors used can have a relatively small capacity in that the switching frequency, at which said module configurations are changed and thus recharging is carried out, is high in comparison to the frequency of the output voltage frequency to be realized.

43. Method according to claim 42, characterized in that the charging time of said capacitors is shorter by a factor of 100, preferably be a factor of 1000 than the period duration of the output voltage to be realized.

44. Method according to claim 29, where said power converter is operated with a negative load current for the supply of energy into the direct current supply.

45. Method according to claim 44, where said controller device for switching said modules takes into account this sign reversal.

46. Power converter module, preferably four-quadrant module, for use in a method according to claim 29.

47. Power converter module according to claim 46, where said energy storage unit is a capacitor and said module comprises two module terminals for the serial connection to further modules as well as an input for control signals for controlling said switching devices.

48. Module configuration preconnected in series consisting of power converter modules according to claim 46 for use in a method according to claim 29.

49. Controller device for use in a method according to claim 29 for controlling the switching states of all modules.

50. Controller device according to claim 49, where said controller device is programmable in order to be able to operate said power converter for different purposes, in particular output frequencies.

51. Controller device according to claim 49, where said controller device is preferably switchable via radio in order to be able to change the mode of operation of a power converter during its operation.

* * * * *